United States Patent [19]

Kasai et al.

[11] Patent Number: 5,480,346
[45] Date of Patent: Jan. 2, 1996

[54] APPARATUS FOR MANUFACTURING A CHAIN OF LINKED FOOD PRODUCTS

[75] Inventors: Minoru Kasai, Ebina; Minoru Nakamura, Tokyo, both of Japan

[73] Assignee: Hitec Co., Ltd., Tokyo, Japan

[21] Appl. No.: 52,757

[22] Filed: Apr. 27, 1993

[30] Foreign Application Priority Data

Apr. 30, 1992 [JP] Japan ................................ 4-137758
Jan. 22, 1993 [JP] Japan ................................ 5-027588

[51] Int. Cl.⁶ ................................................ A22C 11/10
[52] U.S. Cl. ........................... 452/47; 452/48; 452/51
[58] Field of Search ........................... 452/46, 47, 51, 452/48, 32, 33

[56] References Cited

U.S. PATENT DOCUMENTS

| | | | |
|---|---|---|---|
| 3,694,853 | 10/1972 | Greider | 452/47 |
| 4,073,039 | 2/1978 | Müller et al. | 452/47 |
| 4,437,209 | 3/1984 | Duroyon | 452/32 |
| 4,547,931 | 10/1985 | Staudenrausch et al. | 452/51 |
| 4,570,301 | 2/1986 | Beckman et al. | 452/46 |
| 4,614,005 | 9/1986 | Townsend | 452/47 |
| 5,083,970 | 1/1992 | Reutter | 452/46 |

*Primary Examiner*—Willis Little
*Attorney, Agent, or Firm*—Nixon & Vanderhye

[57] ABSTRACT

An apparatus for manufacturing a chain of linked sausages or the like includes a nozzle having a material-discharging end for discharging meat serving as a material; a material-supplying device for intermittently supplying a substantially fixed amount of the material into the nozzle; a braking member for braking the release of a sheep intestine fitted over the nozzle from the material-discharging end; a rotation-imparting device for rotating the nozzle; a determining device for determining the position of a twisted portion occurring in the sheep intestine which contains the material discharged from the material-discharging end and is released from the material-discharging end; a removing device for removing from a vicinity of the material-discharging end the sheep intestine containing the meat and released from the material-discharging end; and a controlled-pusher device for pushing a trailing end of the sheep intestine fitted over the nozzle toward the material-discharging end in a controlled state.

33 Claims, 30 Drawing Sheets

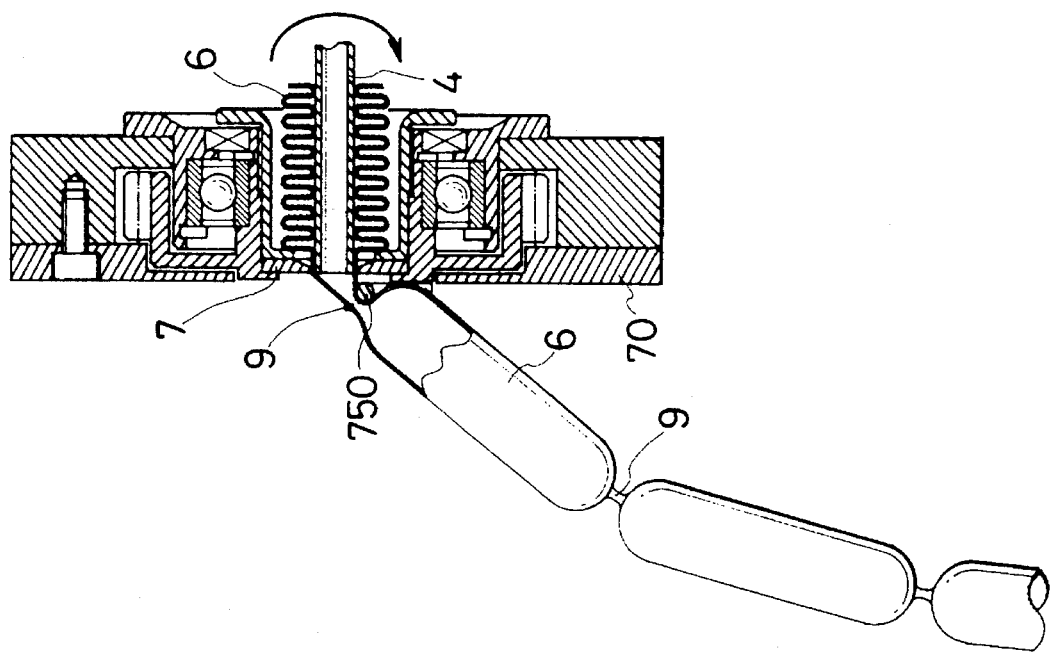
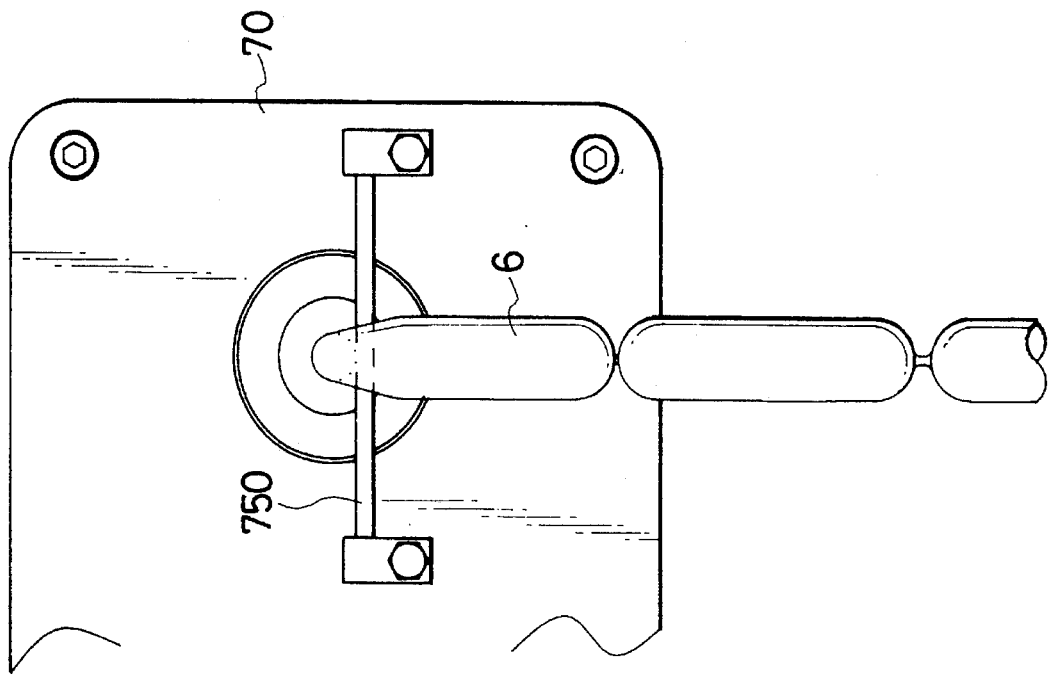

APPARATUS FOR MANUFACTURING A CHAIN OF LINKED FOOD PRODUCTS

BACKGROUND OF THE INVENTION

1. Field of the Invention

The present invention relates to an apparatus for manufacturing foodstuffs such as sausages, cheeses, and mentaiko (seasoned and salted walleye pollack roe) by sealing a fixed amount of a raw material into a casing and by twisting the casing stuffed with the material to form a chain of linked products.

2. Description of the Related Art

Conventional apparatuses of this type are disclosed in U.S. Pat. No. 3,140,509, Japanese Patent Publication No. 353/1966, Japanese Utility Model Publication No. 33916/1971, Japanese Patent Publication No. 13329/1989 (corresponding to U.S. Pat. No. 4,539,796), Japanese Patent Publication No. 58696/1991 (corresponding to U.S. Pat. No. 4,602,402), Japanese Utility Model Application Laid-Open Nos. 117475/1991, 28081/1992, and 68683/1992, U.S. Pat. No. 4,021,885, Japanese Patent Publication No. 50294/1984 (corresponding to U.S. Pat. No. 4,091,505), and so on.

The apparatus disclosed in U.S. Pat. No. 3,140,509 is arranged such that during the process of forming a twisted portion of a sausage, a holding member holds an outer peripheral portion of a stuffed casing drawn out from a nozzle. According to this apparatus, a twist can take place at any position between a tip of the nozzle and a holding position, with the result that the twisting position can possibly vary. In addition, although a deflecting member of this apparatus is so arranged as to cause the stuffed casing to be directed downward during the process of forming a twisted portion, there are problems in that this deflection member hampers the advance of the stuffed casing during a stuffing process, and that breakage is liable to occur in the stuffed casing.

In addition, deflection rollers of the apparatus disclosed in Japanese Patent Publication No. 353/1966 also have similar problems to those of the aforementioned deflecting member, and are not necessarily satisfactory.

With the apparatus disclosed in Japanese Utility Model Publication No. 33916/1971, the stuffed casing is held by a hook and a roller during the process of forming a twisted portion of a sausage so as to stop the rotation of the stuffed casing. With this apparatus as well, a twist can take place at any position between the tip of the nozzle and the holding position in the same way as the apparatus disclosed in the aforementioned U.S. Pat. No. 3,140,509, with the result that the twisting position can possibly vary.

Meanwhile, Japanese Patent Publication No. 58696/1991 discloses an apparatus in which, constantly during the stuffing process, a pushing member is continuously pushed against an intestinal tract by a pneumatic cylinder, and the advancing speed of the pushing member by means of the pneumatic cylinder is controlled by the speed of consumption of a shirred portion of the intestinal tract. According to this apparatus, since the working pressure of the pneumatic cylinder constantly acts on the intestinal tract and excessively compresses the shirred portion, there is a possibility of the casing becoming difficult to be drawn out from the nozzle.

In addition, with the apparatus disclosed in Japanese Utility Model Application Laid-Open No. 117475/1991, an intestine feeding collar, which advances by being pushed by a spring member, constantly pushes the intestine. With such an arrangement, there is a risk of the spring pressure of the spring member excessively compressing the shirred portion.

Japanese Utility Model Application Laid-Open No. 28081/1992 discloses an apparatus in which a bellows is extended by air sent in intermittently. According to this apparatus, since the extending system is based on pneumatic pressure, it is difficult to control the position and speed of the operation of extending the bellows as desired. Hence, it is difficult to push the intestine at a rate commensurate with the amount of consumption of a sheep intestine by the intestine feeding collar.

The apparatus disclosed in U.S. Pat. No. 4,021,885 is arranged such that the casing stuffed with a material is pulled out of the nozzle by a transport conveyor in synchronism with stuffing and twisting cycles of a stuffing machine. Hence, with this apparatus, it is difficult to maintain a fixed twisting position of the stuffed casing. Therefore, the length between the twisted positions (link length) is liable to vary, so that this apparatus is not suitable to connection to a looping apparatus which is operated in synchronism with a fixed-amount stuffing machine.

With the apparatus disclosed in Japanese Patent Publication No. 50294/1984, since the outside diameter of the sheep intestine is not uniform, it is difficult to make uniform each link length which has been stuffed in a fixed amount and twisted. In addition, the position where the twist takes place is difficult to fix, so that there is the likelihood that the tendency toward the nonuniformity of each link length is further increased. In addition, this apparatus is arranged such that the twisted portion is retained in the vicinity of the nozzle, but since there is a possibility of the variation of the link length becoming large, this apparatus is not suitable for retention of twisted portions on a stable and reliable basis.

With the apparatus disclosed in Japanese Patent Publication No. 50294/1984, there are cases where the value of sliding resistance at the time of the drawing out of the casing from the nozzle varies. Accordingly, since the link length in the case of the sheep intestine, in particular, is determined by the value of sliding resistance at the time of the drawing out of the sheep intestine from the nozzle, there is a likelihood that the nonuniformity of each link length is further increased. As such, with this apparatus, since there is the possibility that the link length varies, the reliable retention of the twisted portions can possibly become difficult.

SUMMARY OF THE INVENTION

The present invention has been devised in view of the above-described problems, and its object is to provide an apparatus for manufacturing a chain of linked sausages or the like which makes it possible to substantially fix the position of occurrence of a twist, which therefore makes it possible to substantially fix the weight of each material between the twists and substantially fix the number of twists at twisted portions, thereby making it possible to prevent the twisted portions of each link from being untwisted.

Another object of the present invention is to provide an apparatus for manufacturing a chain of linked sausages or the like in which, by making it possible to omit a conventional fixed guide, resistance applied to a casing having a material filled therein and released from a material-discharging end of a nozzle can be reduced, and therefore the breakage of the casing can be favorably reduced.

Still another object of the present invention is to provide an apparatus for manufacturing a chain of linked sausages or the like in which, by making it possible to maintain a fixed sliding resistance of a casing fitted over a nozzle, a product configuration and resiliency (hardness) can be fixed and made uniform, and also the breakage of the casing can be reduced.

A further object of the present invention is to provide an apparatus for manufacturing a chain of linked sausages or the like which can be used for both artificial casings and casings made of natural intestines, such as the intestines of sheep and the intestines of hogs, and which can be used for both an apparatus in which the nozzle is rotated continuously and an apparatus in which the nozzle is rotated intermittently.

A still further object of the present invention is to provide an apparatus for manufacturing a chain of linked sausages or the like which is capable of attaining automation and labor saving in the stuffing operation.

A further object of the present invention is to provide an apparatus for manufacturing a chain of linked sausages or the like which is capable of continuing the material-filling operation without stopping the operation of the apparatus even if the casing breaks, and which is therefore capable of continuously performing the looping operation and the operation of suspending the chain of linked sausages from a smoking stick following the material-filling operation.

In accordance with one aspect of the present invention, the above-described objects are attained by an apparatus for manufacturing a chain of linked sausages or the like, comprising: a nozzle having a material-discharging end; material-supplying means for intermittently supplying a substantially fixed amount of a material into the nozzle; a braking member for braking the release of a casing fitted over the nozzle from the material-discharging end; rotation-imparting means for rotating the nozzle; and determining means for determining the position of a twist occurring in the casing which contains the material discharged from the material-discharging end and is released from the material-discharging end.

In accordance with another aspect of the present invention, the above-described objects are also attained by the above-described apparatus for manufacturing a chain of linked sausages or the like, which further comprises removing means for removing from a vicinity of the material-discharging end the casing containing the material and released from the material-discharging end.

In accordance with still another aspect of the present invention, the above-described objects are also attained by an apparatus for manufacturing a chain of linked sausages or the like, comprising: a nozzle having a material-discharging end; material-supplying means for intermittently supplying a substantially fixed amount of a material into the nozzle; a braking member for braking the release of a casing fitted over the nozzle from the material-discharging end; rotation-imparting means for rotating the nozzle; and controlled-pusher means for pushing a trailing end of the casing fitted over the nozzle toward the material-discharging end in a controlled state.

In accordance with a further aspect of the present invention, the above-described objects are also attained by an apparatus for manufacturing a chain of linked sausages or the like, comprising: a nozzle having a material-discharging end; material-supplying means for intermittently supplying a substantially fixed amount of a material into the nozzle; a braking member for braking the release of a casing fitted over the nozzle from the material-discharging end; rotation-imparting means for rotating the nozzle; transporting means for receiving at a lower position spaced apart a predetermined distance from the material-discharging end the casing containing the material and released and suspended from the material-discharging end, and for consecutively transporting the material-containing casing received; and controlled-pusher means for pushing a trailing end of the casing fitted over the nozzle toward the material-discharging end in a controlled state.

In the present invention, determining means may be arranged to determine the position of the twist occurring in the casing in synchronism with the intermittent supply of the material by the material-supplying means.

The determining means according to an example includes detecting means for detecting the intermittent supply of the material by the material-supplying means and clamping means for clamping the casing released from the material-discharging end on the basis of a detection signal from the detecting means. The determining means according to another example includes detecting means for detecting the intermittent supply of the material by the material-supplying means and bending means for bending the casing released from the material-discharging end on the basis of a detection signal from the detecting means. It should be noted that a brake may be imparted to the advance of the casing being released from the nozzle by the determining means, and if the degree of this brake is adjusted, it is possible to adjust the degree of the resiliency of the product.

The controlled-pusher means in accordance with one example of the present invention includes storage means for storing a pushing program in advance, and the trailing end of the casing is pushed in accordance with the pushing program. The controlled-pusher means in accordance with another example of the present invention includes an electric motor for generating a pushing force. In this case, the controlled-pusher means may further include storage means for storing a pushing program in advance, and the electric motor may be operated in accordance with the pushing program stored in the storage means. In addition, the controlled-pusher means may further include detecting means for detecting a form of the casing fitted over the nozzle, and the electric motor may be operated in accordance with a detection signal from the detecting means.

In the apparatus for manufacturing a chain of linked sausages or the like in accordance with the present invention, a substantially fixed amount of a material is intermittently supplied to the nozzle from the material-supplying means, and the material is discharged intermittently from the material-discharging end of the nozzle which is rotated. The material discharged from this material-discharging end is received in the casing fitted over the nozzle, and a portion of the casing which continues from and is pulled by that portion of the casing containing the material is released from the material-discharging end against a braking force applied by the braking member. At this time, the determining means determines the position of a twist occurring in the casing released from the material-discharging end, with the result that desired twists are consecutively formed in the casing released from the material-discharging end.

In the apparatus for manufacturing a chain of linked sausages or the like in accordance with the present invention, the removing means removes from the vicinity of the material-discharging end the casing containing the material and released from the material-discharging end, thereby removing the material-containing casing staying in the vicinity of the material-discharging end.

Furthermore, in the apparatus for manufacturing a chain of linked sausages or the like in accordance with the present invention, the controlled-pusher means pushes the trailing end of the casing fitted over the nozzle toward the material-discharging end in a controlled state, so that the state of the casing fitted over the nozzle in the vicinity of the braking member is maintained in a substantially fixed state.

The other objects, features and advantages of the present invention will become more apparent from the following detailed description of the invention when read in conjunction with the accompanying drawings. It should be noted that the present invention is not limited to these embodiments and may be implemented by appropriately combining the embodiments, and that various other modifications are possible without departing from the scope and spirit of the present invention.

BRIEF DESCRIPTION OF THE DRAWINGS

FIG. 33 is a Side cross-sectional view of a further example of the determining means of the present invention; and FIG. 34 is a front elevational view of the determining means of the example shown in FIG. 33.

DESCRIPTION OF THE PREFERRED EMBODIMENTS

Figure 1:
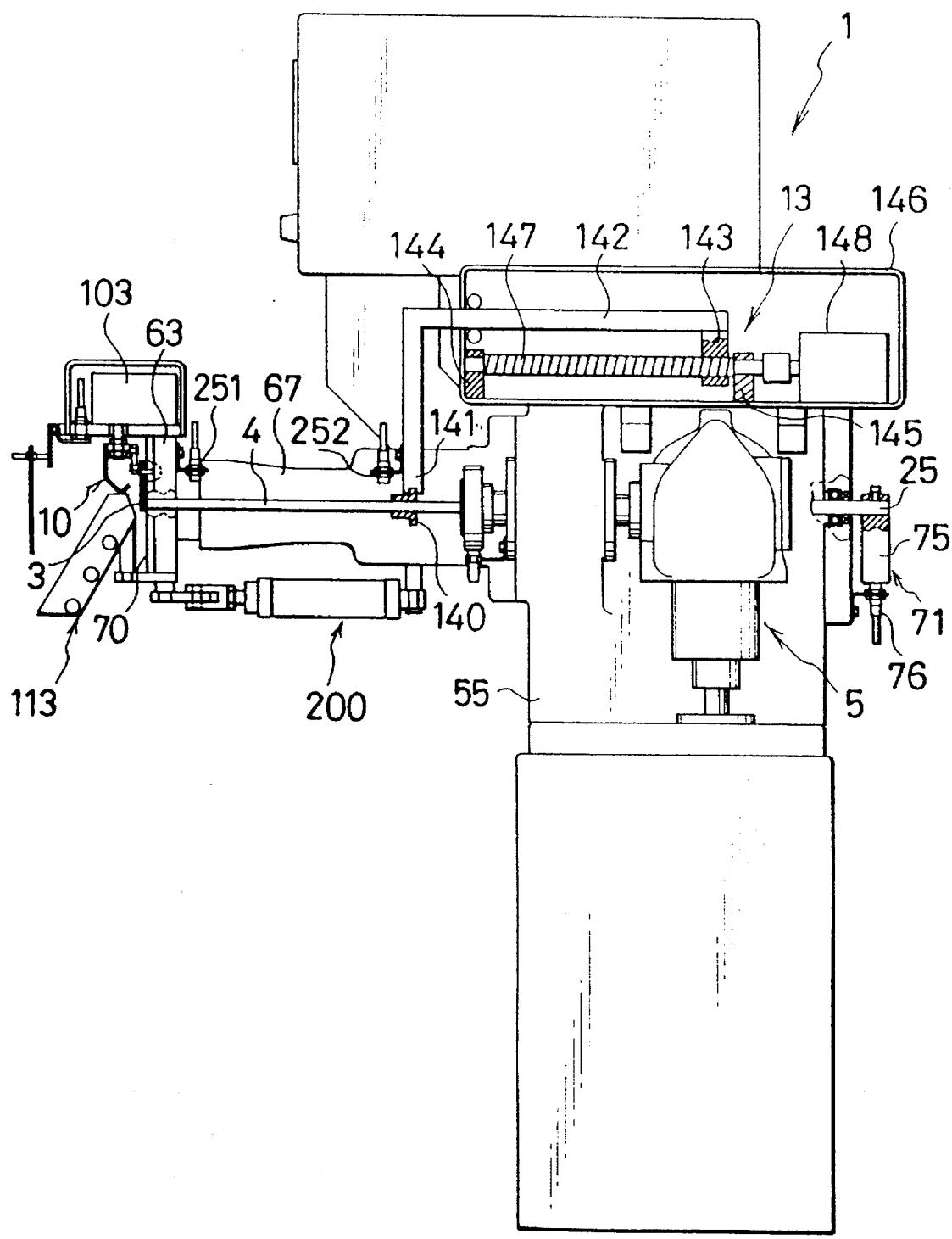
FIG. 1 is a side elevational view of a preferred embodiment of the present invention.

In FIGS. 1 to 13, an apparatus 1 for manufacturing a chain of linked sausages or the like comprises a nozzle 4 having a material-discharging end 3 for discharging meat 2 used as a material; a material-supplying means 5 for intermittently supplying a substantially fixed amount of meat to the nozzle 4; a braking member 7 for braking the release of a natural casing, such as a sheep intestine 6, as a casing fitted over the nozzle 4 from the material-discharging end 3; a rotation-imparting means 8 for rotating the nozzle 4; a determining means 10 for determining the position of a twisted portion 9 occurring in the sheep intestine 6 which contains the meat 2 discharged from the material-discharging end 3 and which has been released from the material-discharging end 3; a removing means 11 for removing from the vicinity of the material-discharging end 3 the sheep intestine 6 containing the meat 2 and released from the material-discharging end 3; and a controlled-pusher means 13 for pushing a trailing end 12 of the sheep intestine 6 fitted over the nozzle 4 toward the material-discharging end 3 in a controlled state.

Figure 8:
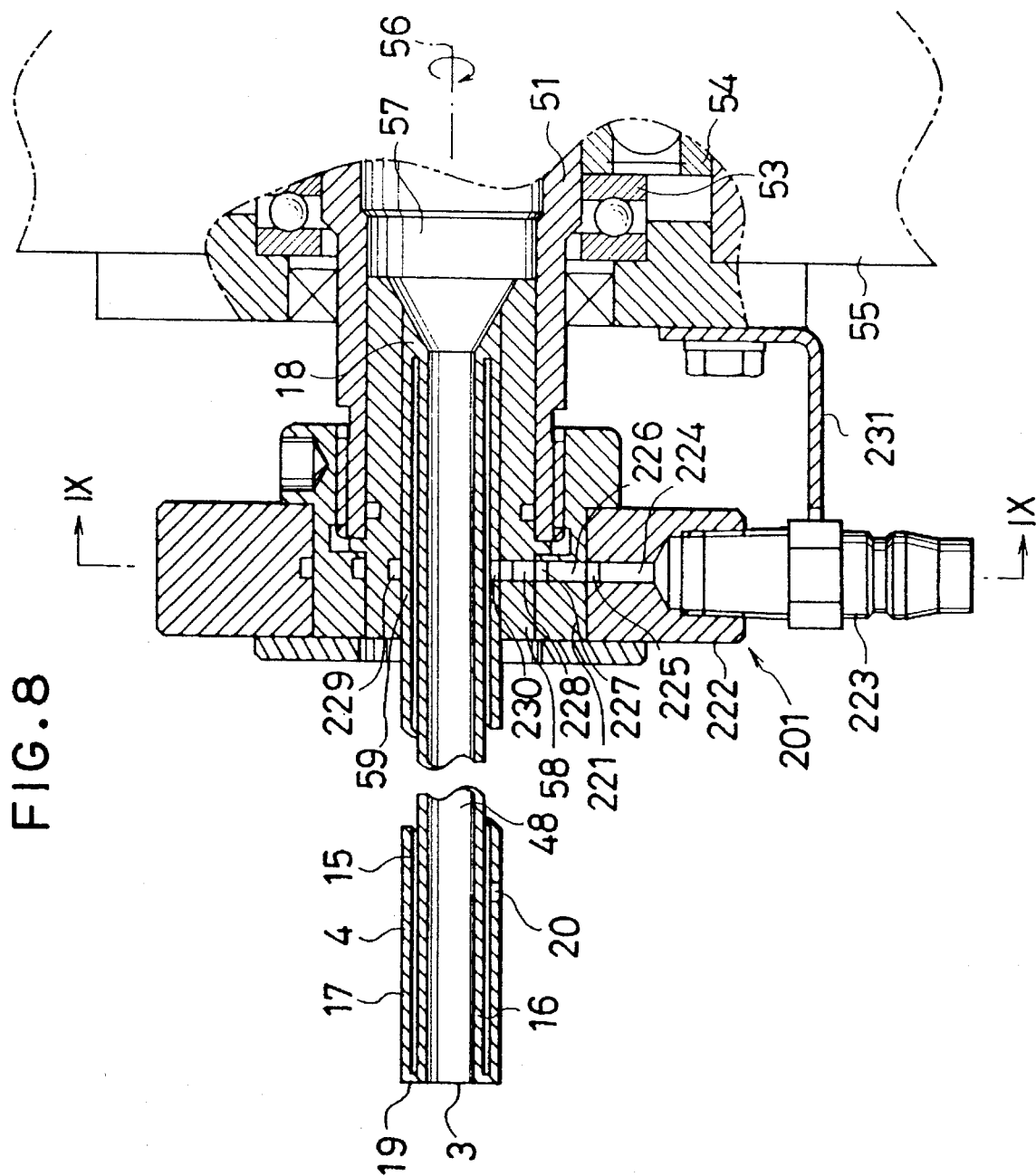
FIG. 8 is a detailed cross-sectional view of a water supplying means shown in FIG. 1.

As shown in FIG. 8, the nozzle 4 of this embodiment has an inner cylinder portion 16 and an outer cylinder portion 17 which are arranged coaxially and form an elongated cylindrical space 15 therebetween. The inner cylinder portion 16 and the outer cylinder portion 17 are connected to each other at opposite ends 18 and 19 thereof. Along the direction in which the nozzle 4 extends, one or a multiplicity of radial through holes 20 are arranged in the outer cylinder portion 17 over which the sheep intestine 6 is fitted, in such a manner as to allow the cylindrical space 15 to communicate with the outside. It should be noted that as the nozzle of the present invention, a nozzle consisting of a known single pipe which does not have the through holes formed in the nozzle 4 shown in this embodiment may be used instead of the nozzle 4 shown in this embodiment, and the form of the nozzle is not restricted.

The braking meter 7 has an annular configuration and is inserted over the nozzle 4 in the vicinity of the material-discharging end 3. The sheep intestine 6 is fitted by being shrunk over the outer peripheral surface of the nozzle 4 in such a manner as to be released from the material-discharging end 3 after passing through an annular inner peripheral surface of the braking member 7 and the outer peripheral surface of the nozzle 4. At the time of this release, the braking member 7 operates in such a manner as to brake the releasing of the sheep intestine 6 from the material-discharging end 3 on the basis of its sliding resistance.

Figure 4:
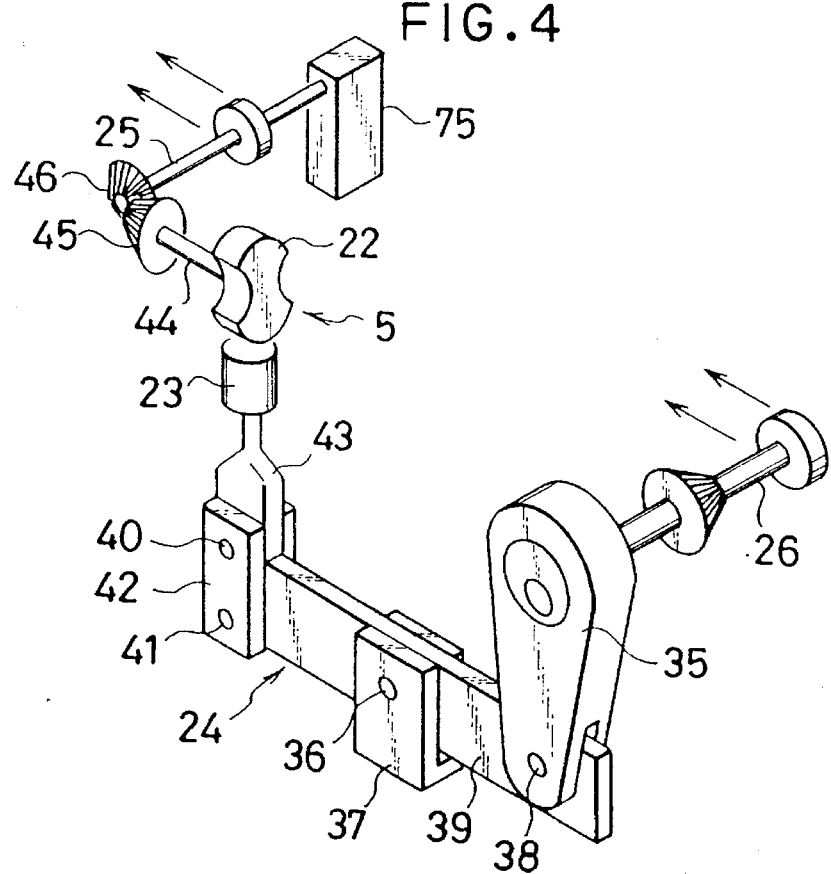
FIG. 4 is an explanatory diagram of a material-supplying means in accordance with the embodiment shown in FIG. 1.
Figure 5:
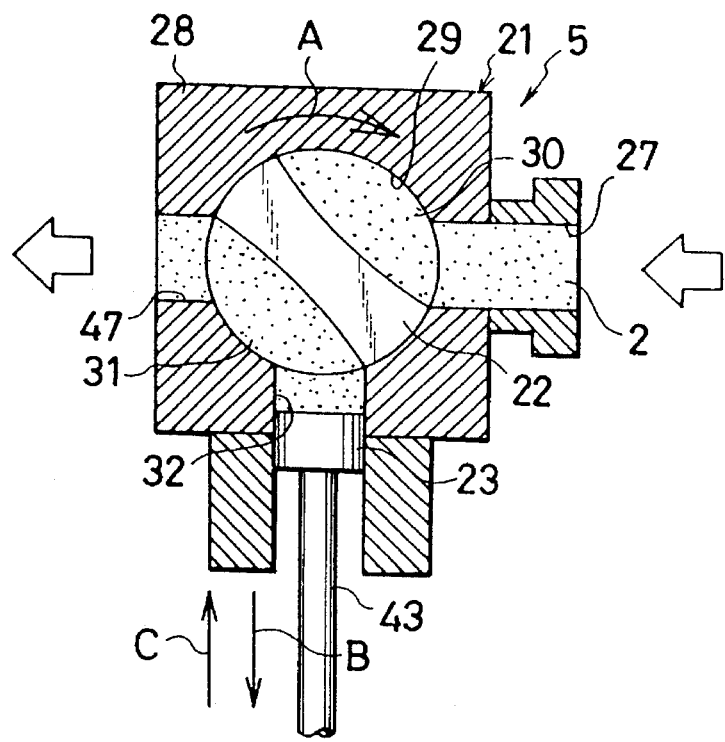
FIG. 5 is an explanatory diagram of a valve of the material-supplying means in accordance with the embodiment shown in FIG. 1.

As shown in FIG. 4, the material-supplying means 5 is comprised of a valve 21; a transmitting mechanism 24 for transmitting a rotational force and a reciprocating force to a partition wall 22 of the valve 21 and a piston 23; an unillustrated electric motor whose output rotating shaft is coupled to rotating shafts 25 and 26 of the transmitting mechanism 24 via a belt, a gear and the like; and an unillustrated material-supplying pump communicating with an input port 27 of the valve 21. As shown in FIG. 5, the partition wall 22 of the valve 21 is disposed rotatably in a chamber 29 formed in a valve body 28, and divides the chamber 29 into two chambers 30 and 31. The piston 23 is reciprocatably disposed in a hole 32 communicating with the chamber 29. The transmission mechanism 24 is comprised of a crank arm 35 to which the shaft 26 is connected eccentrically and rotatably; a link 39 which is swingably supported by a support member 37 via a pin 36 and has one end rotatably connected to one end of the crank arm 35 via a pin 38; a connecting rod 43 having one end rotatably connected to the link 39 via pins 40 and 41 and a connecting member 42 and another end rotatably connected to the piston 23; a rotating shaft 44 having one end secured to a center of the partition wall 22; a bevel gear 45 attached to the other end of the rotating shaft 44; and a bevel gear 46 meshing with the bevel gear 45 and attached to the rotating shaft 25. The crank arm 35, the link 39, and the connecting rod 43 converts the rotation of the rotating shaft 26 into a reciprocating motion and transmits the same to the piston 23, while the bevel gears 45 and 46 and the rotating shaft 44 reduce the rotation of the rotating shaft 25 by half and transmits the same to the partition wall 22. In addition to the input port 27, an output port 47 is formed in the valve body 28. It should be noted that the rotating shafts 25 and 26 are coupled to the output rotating shaft of the aforementioned unillustrated electric motor so that the rotating shaft 26 also undergoes one revolution as the rotating shaft 25 undergoes one revolution.

Figure 26:
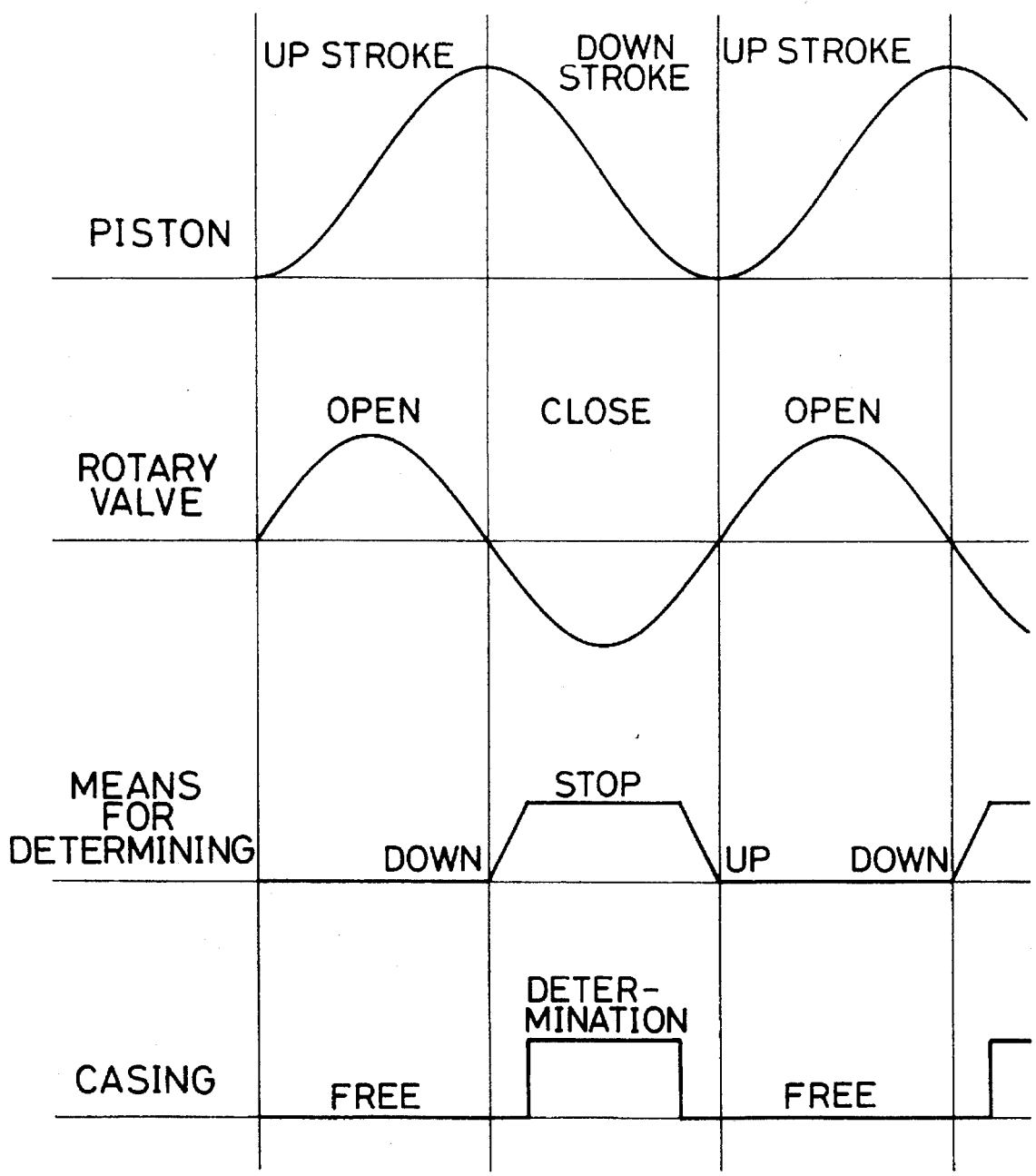
FIG. 26 is a timing chart of the operation of the material-supplying means and the determining means of the present invention.

In the material-supplying means 5 arranged as described above, as the partition wall 22 rotates in the direction of A due to the rotation of the rotating shaft 25, in a case where the port 27 and the hole 32 are made to communicate with each other via the chamber 29, the piston 23 is moved in the direction of B by the rotation of the rotating shaft 26. Accordingly, the meat from the material-supplying pump is supplied to the hole 32 via the port 27 and the chamber 29. In a case where the partition wall 22 is further rotated in the direction of A, and the hole 32 and the port 47 are made to communicate with each other via the chamber 29, the piston 23 is moved in the direction of C by the rotation of the rotating shaft 26. Hence, the meat from the hole 32 is discharged to the port 47 via the chamber 29. The operation takes place in the same way on the chamber 31 side as well. Therefore, the material-supplying means 5 operates in such a manner as to intermittently discharge a fixed amount of meat to the port 47 twice per rotation of the partition wall 22 (corresponding to two reciprocations of the piston 23). In other words, the material-supplying means 5 discharges a fixed amount of meat to the port 47 when the piston 23 moves in the direction of C, and stops the discharging of the meat to the port 47 when the piston 23 moves in the direction of B (see FIG. 26).

Figure 6:
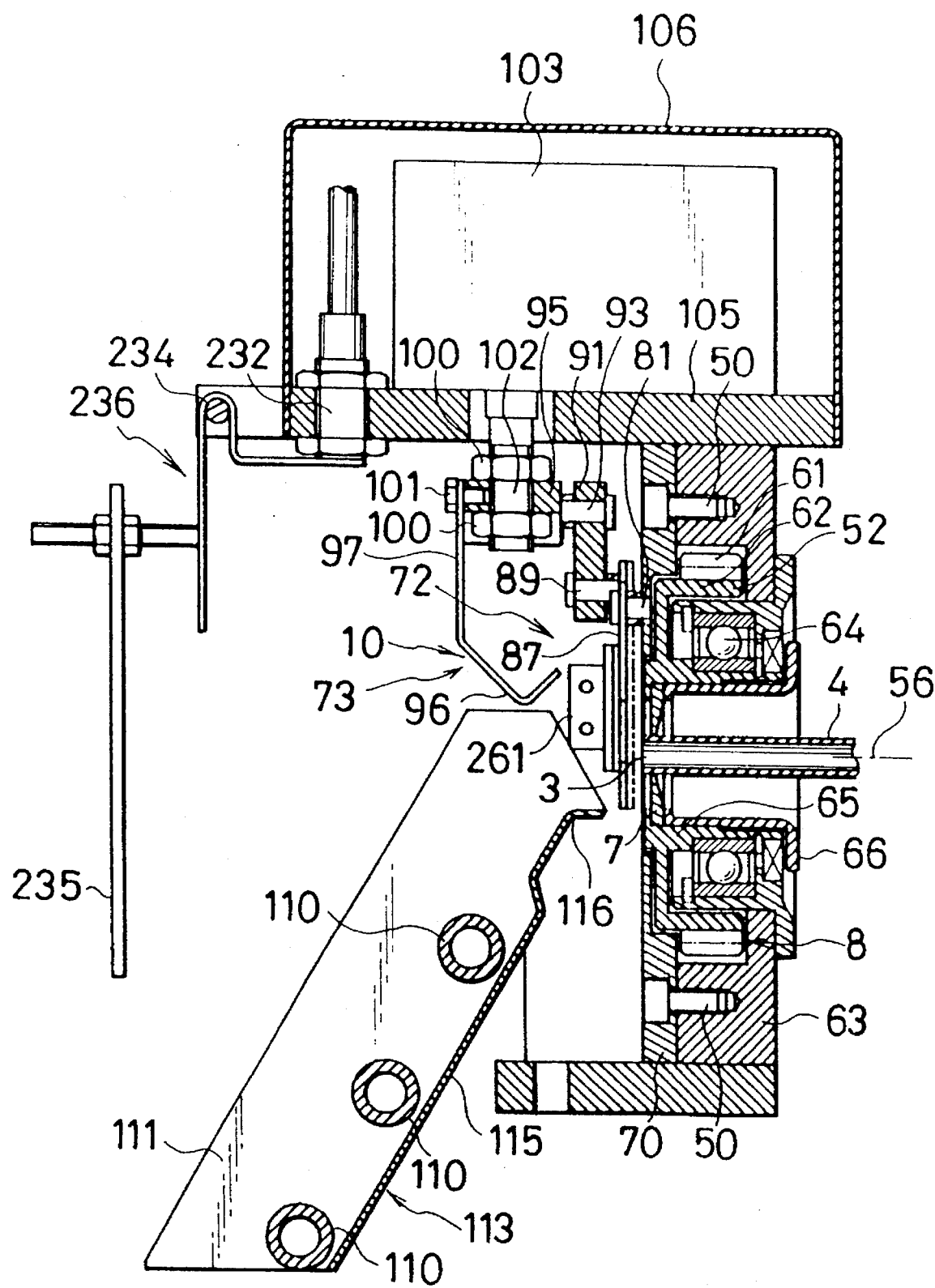
FIG. 6 is a detailed cross-sectional view of a determining means in accordance with the embodiment shown in FIG. 1.

The rotation-imparting means 8 shares the unillustrated electric motor of the material-supplying means 5. As shown in FIGS. 6 and 8, in addition to this electric motor, the rotation-imparting means 8 comprises toothed cylinders 51 and 52, and a transmission mechanism constituted by an unillustrated belt, a gear and the like for imparting the rotation of the output rotating shaft of the electric motor to these toothed cylinders 51 and 52. The cylinder 51 is mounted on an apparatus frame 55 via bearings 53 and 54 in such a manner as to be rotatable about an axis 56. The interior 57 of the cylinder 51 communicates with the port 47, and one end 59 of the nozzle 4 is fitted in the interior 57 of the cylinder 51 via another cylinder 58. The nozzle 4 and the cylinder 58 are arranged to form an integral structure. Meanwhile, the cylinder 52 is provided with an outer cylinder portion 62 having teeth 61 on the outer periphery thereof, and an inner cylinder portion 65 attached to a housing 63 in such a manner as to be rotatable about the axis 56 via a bearing 64. A cylinder 66 is threadedly engaged with the inner surface of the inner cylinder portion 65. The braking member 7 has its annular outer peripheral portion clamped by one end of the inner cylinder portion 65 and one end of the cylinder 66, and is disposed in the vicinity of the material-discharging end 3 of the nozzle 4. Here, the interior 48 of the nozzle 4 communicates with the port 47 via the interior 57 of the cylinder 51. As the material-supplying means 5 is operated, the meat 2 is supplied intermittently to the interior 48 of the nozzle 4, and the meat 2 thus supplied is discharged intermittently from the material-discharging end 3. It should be noted that the rotation-imparting means 8 in this embodiment is so arranged as to simultaneously rotate the braking member 7 as well.

In the rotation-imparting means 8 arranged as described above, as the output rotating shaft of the unillustrated motor rotates, the cylinder 51 is rotated on the one hand, while the cylinder 52 is rotated about the axis 56 in the same direction as the rotating direction of the nozzle 4. As a result, the nozzle 4 is rotated continuously about the axis 56 at a constant speed, and the braking member 7 is similarly rotated continuously about the axis 56 at a constant speed in synchronism with the nozzle 4. Since the rotation-imparting means 8 and the material-supplying means 5 are operated by the identical electric motor as described above, the rotation of the braking member 7 and the nozzle 4 is synchronized with the rotation of the partition wall 22 and the reciprocating motion of the piston 23. The unillustrated transmitting mechanism is arranged such that the braking member 7 and the nozzle 4 undergo four revolutions per reciprocating motion of the piston 23, i.e., undergo two revolutions while the material is being discharged, and undergo two revolutions while the discharging of the material is being stopped in the ensuing step. As the nozzle 4 rotates, the sheep intestine 6 fitted over the nozzle 4 in a shrunk state is also rotated in the same direction by being dragged. The sheep intestine 6, while being rotated, is released from the material-discharging end 3 through the gap between the annular inner peripheral surface of the braking member 7 and the outer peripheral surface of the nozzle 4. At the time of this release, the braking member 7 operates in such a manner as to brake the releasing of the sheep intestine 6 from the material-discharging end 3 on the basis of its sliding resistance. It should be noted that in this embodiment the braking member 7 and the nozzle 4 are constantly rotated by the above-described rotation-imparting means 8. Although in this embodiment the braking member 7 is also rotated by the unillustrated electric motor via the outer cylinder portion 62, an arrangement may be alternatively provided such that, by omitting such as the aforementioned mechanism for transmitting the rotation from the electric motor to the outer cylinder portion 62, the braking member 7 is simply mounted rotatably on the housing 63 so that the braking member 7 is rotated by being dragged by the rotation of the nozzle 4. Still alternatively, an arrangement may be provided such that the braking member 7 is secured on the housing 63 and the braking member 7 itself does not rotate. Furthermore, in the present invention, the rotation-imparting means 8 may be arranged such that the rotation of the nozzle 4 and, if necessary, the braking member 7 is stopped while the meat 2 is being discharged from the material-discharging end 3, i.e., such that these members are rotated intermittently.

Figure 2:
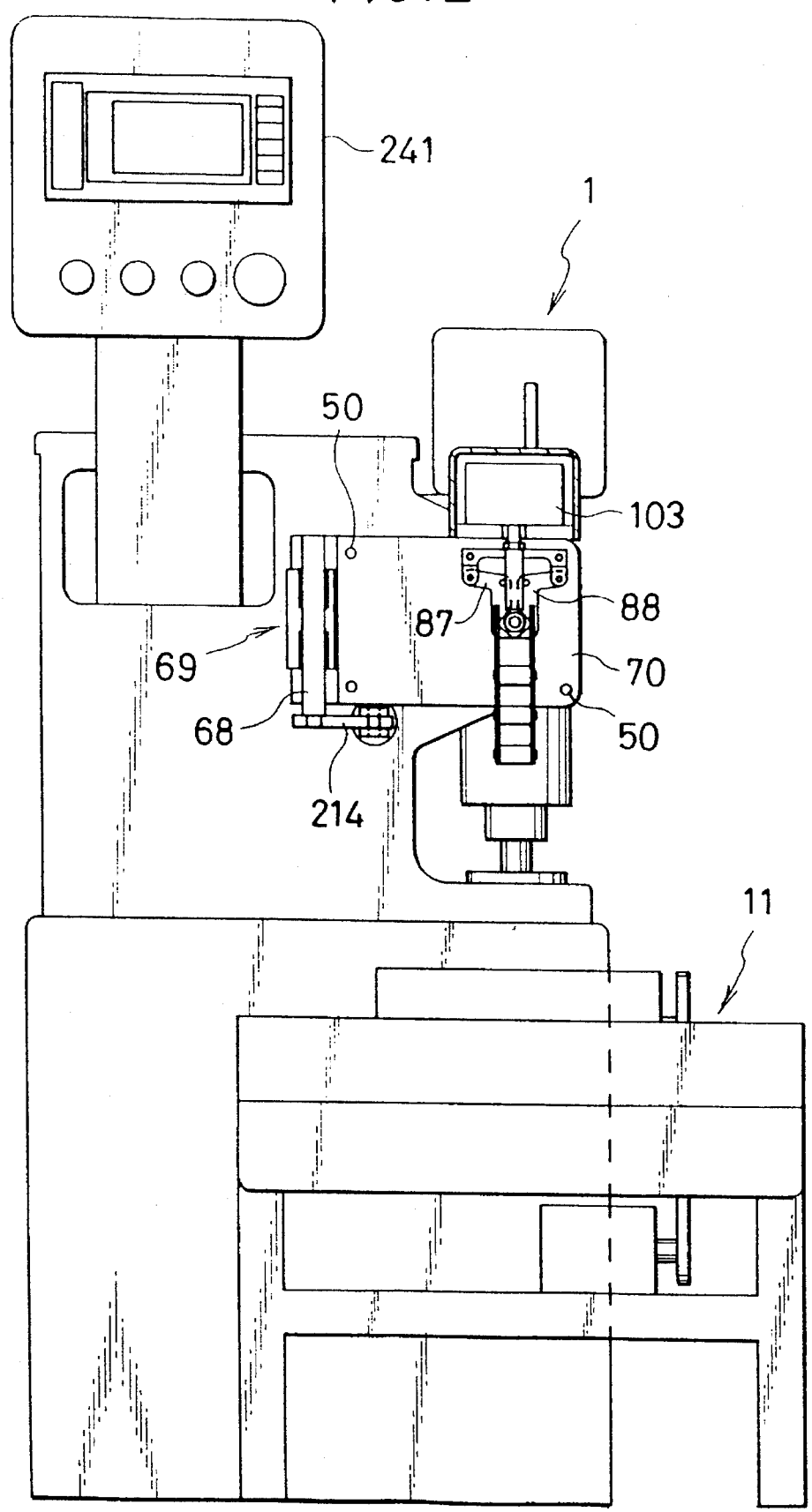
FIG. 2 is a front elevational view of the preferred embodiment of the present invention.

Referring to FIGS. 1 and 2, the housing 63 is attached to an arm section 67 having one end secured to the apparatus frame 55 in such a manner as to be openable with respect to the arm section 67 via a hinge mechanism 69 such as a shaft 68. A cover 70 is attached to the front surface of the housing 63 via a screw 50 or the like. At the time of cleaning or the like, if the screw 50 is removed, the cover 70 can be opened. The rotating shaft, gear, and the like of the transmitting mechanism for transmitting the rotation of the output shaft of the electric motor to the cylinder 52 are arranged in the arm section 67.

Figure 7:
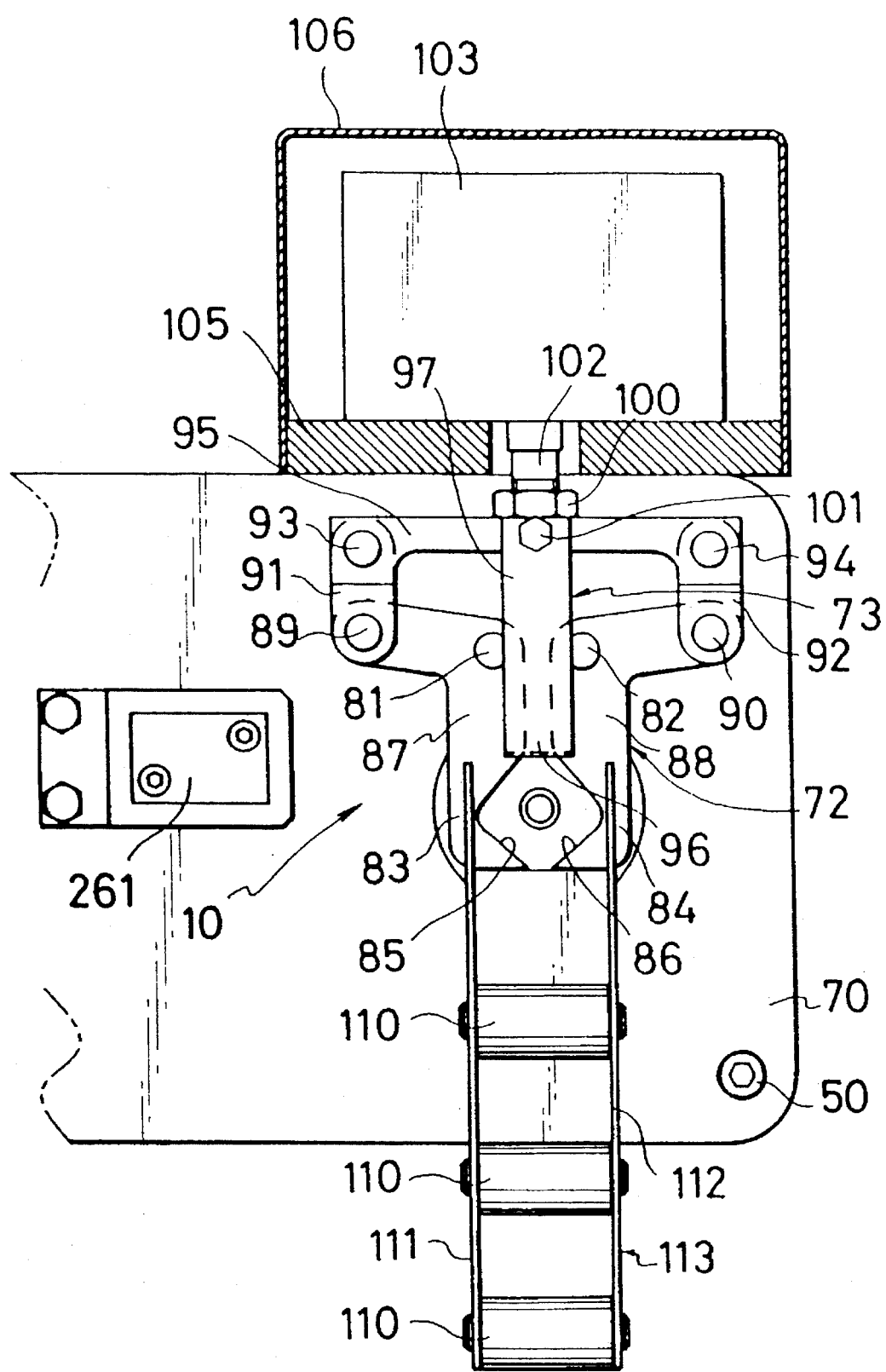
FIG. 7 is a front elevational view of the determining means shown in FIG. 6.

As shown in FIGS. 6 and 7, the determining means 10 in this embodiment is comprised of a detecting means 71 for detecting the intermittent supply of the meat 2 by the material-supplying means 5; a clamping means 72 for clamping the sheep intestine 6 released from the material-discharging end 3 on the basis of a detection signal from the detecting means 71; and a bending means 73 for bending the sheep intestine 6 released from the material-discharging end 3 similarly on the basis of the detection signal from the detecting means 71. The determining means 10 determines the position of the twisted portion 9 in synchronism with the intermittent supply of the meat 2 by the material-supplying means 5.

As shown in FIG. 1, the detecting means 71 is comprised of a detecting element 75 secured to the rotating shaft 25 and a sensor 76 attached to the apparatus frame 55 to detect the approach of the detecting element 75 optically or magnetically, for instance. When the detecting element 75 is rotated by the rotation of the rotating shaft 25, the sensor 76 detects the approach of the detecting element 75 occurring each time the rotating shaft 25 undergoes one revolution, thereby issuing a detection electrical signal. The detecting element 75 is mounted on the rotating shaft 25 so that the occurrence of this detection electrical signal indicates a start of the stopping of the meat discharge in the valve 21, i.e., the arrival of the piston 23 at the top dead center. It should be noted that since there is a time lag between the start of operation of the clamping means 72 and the actual clamping of the sheep intestine 6 by the clamping means 72 which has started the operation, the detection electrical signal may be generated from the detecting means 71 slightly before the arrival of the piston 23 at the top dead center so that the sheep intestine 6 can be actually clamped by the clamping means 72 simultaneously with the stopping of the meat discharge in the valve 21. For this purpose, an adjusting device may be provided to allow the timing of occurrence of the detection electrical signal by the detecting means 71 to be adjusted mechanically or electrically. The detecting element 75 may be mounted on the rotating shaft 26 instead of being mounted on the rotating shaft 25. Furthermore, instead of the detecting means 71, an oscillator may be provided in a controlling device 104, which will be described later, for generating by itself an electrical signal corresponding to the detection electrical signal generated from the detecting means 71. The electrical signal from this oscillator may be used in the same way as the detection electrical signal generated from the detecting means 71. In the case where the detection electrical signal generated from the detecting means 71 is used, the determining means 10 can be operated in synchronism with the intermittent supply of the material by the material-supplying means 5. Also, in the case where the electrical signal generated from the oscillator is used, when fluctuations in the rotation of the rotating shaft 25 do not virtually occur or can be virtually ignored, it is readily possible to obtain an oscillator exhibiting high frequency stability. Hence, the determining means 10 can be operated substantially in synchronism with the intermittent supply of the material by the material-supplying means 5.

As shown in FIG. 7, the clamping means 72 is comprised of a pair of clamping plates 87 and 88 which are mounted rotatably on the cover 70 in face-to-face relation with each other via pins 81 and 82, notches 85 and 86 being formed in distal-end clamping portions 83 and 84, respectively; a pair of links 91 and 92 coupled rotatably to the other ends of the clamping plates 87 and 88 via pins 89 and 90, respectively; and a horizontal member 95 rotatably coupled to the links 91 and 92 via pins 93 and 94. The distal-end clamping portions 83 and 84 of the clamping plates 87 and 88 are disposed in an immediate vicinity of the material-discharging end 3, i.e., at a position which is 0–50 mm, preferably 0.1–10 mm, more preferably 0.1–5 mm, spaced apart from the material-discharging end.

The bending means 73 is provided with a pressing plate 97 having a bent pressing portion 96 at a distal end thereof. Furthermore, the clamping means 72 and the bending means 73 have in common a pneumatic cylinder device 103 and the controlling device 104. The pneumatic cylinder device 103 has a piston rod 102 to which a central portion of the horizontal member 95 and an upper end of the pressing plate 97 are attached by means of a nut 100 and a screw 101. The pneumatic cylinder device 103 is covered with a cover 106 and is disposed on a base 105 mounted on top of the housing 63. The controlling device 104 receives a detection electrical signal from the sensor 76 and actuates the pneumatic cylinder device 103 on the basis of this reception.

Figure 11:
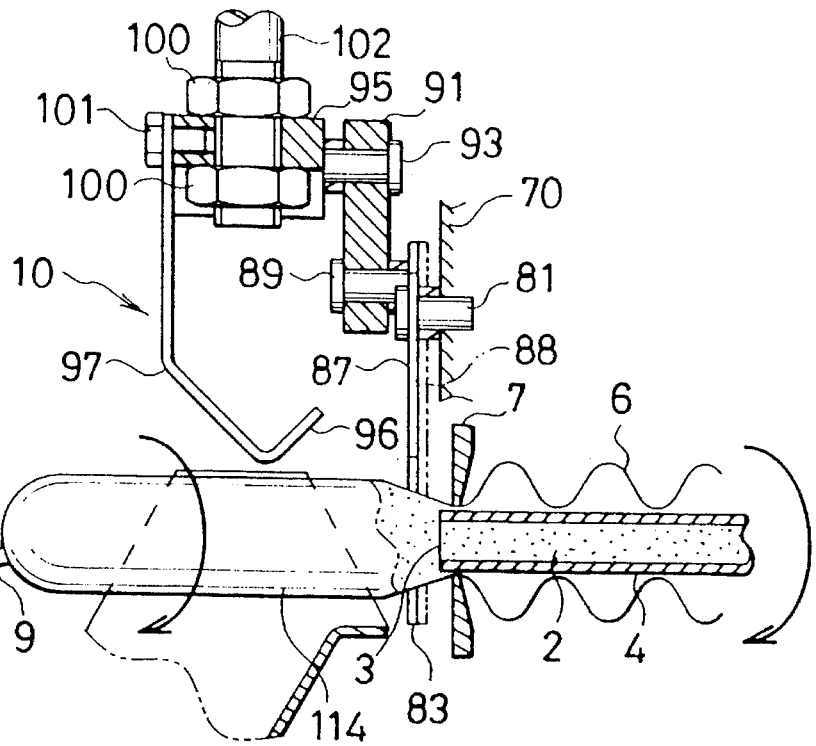
FIG. 11 is an explanatory diagram of the operation during the discharging of meat, as viewed from a side of the determining means in accordance with the embodiment shown in FIG. 1.
Figure 12:
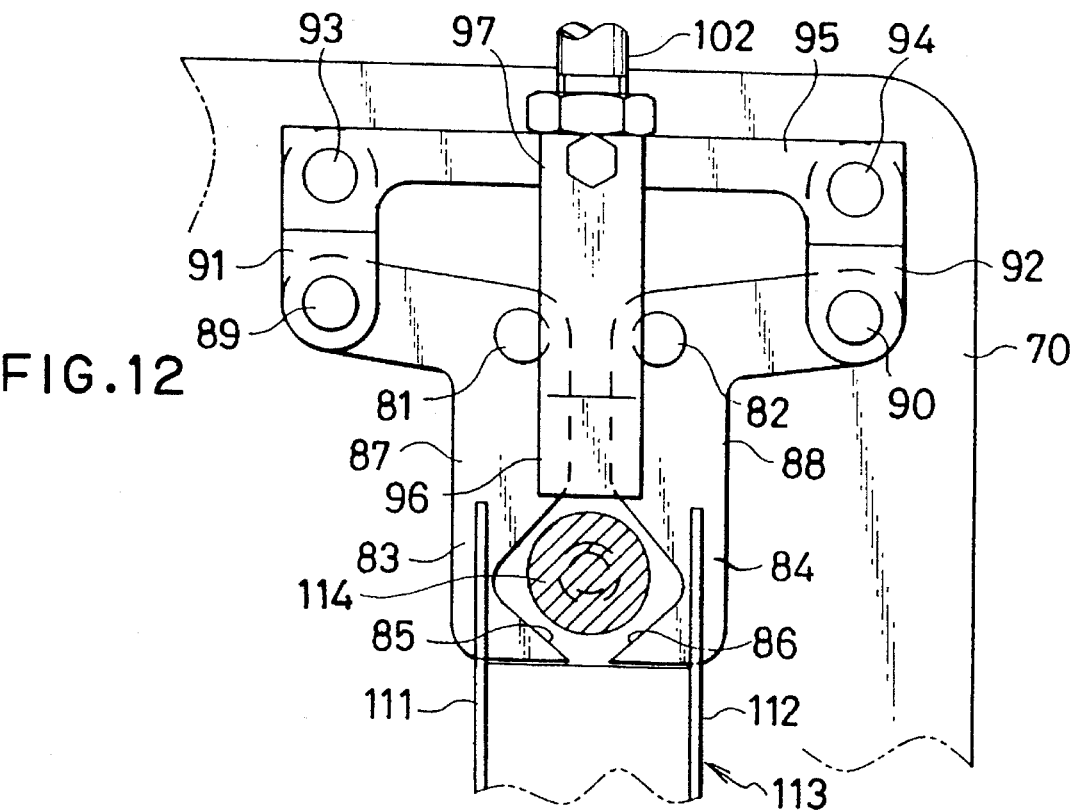
FIG. 12 is an explanatory diagram of the operation during the discharging of meat, as viewed from the front of the determining means in accordance with the embodiment shown in FIG. 1.
Figure 13:
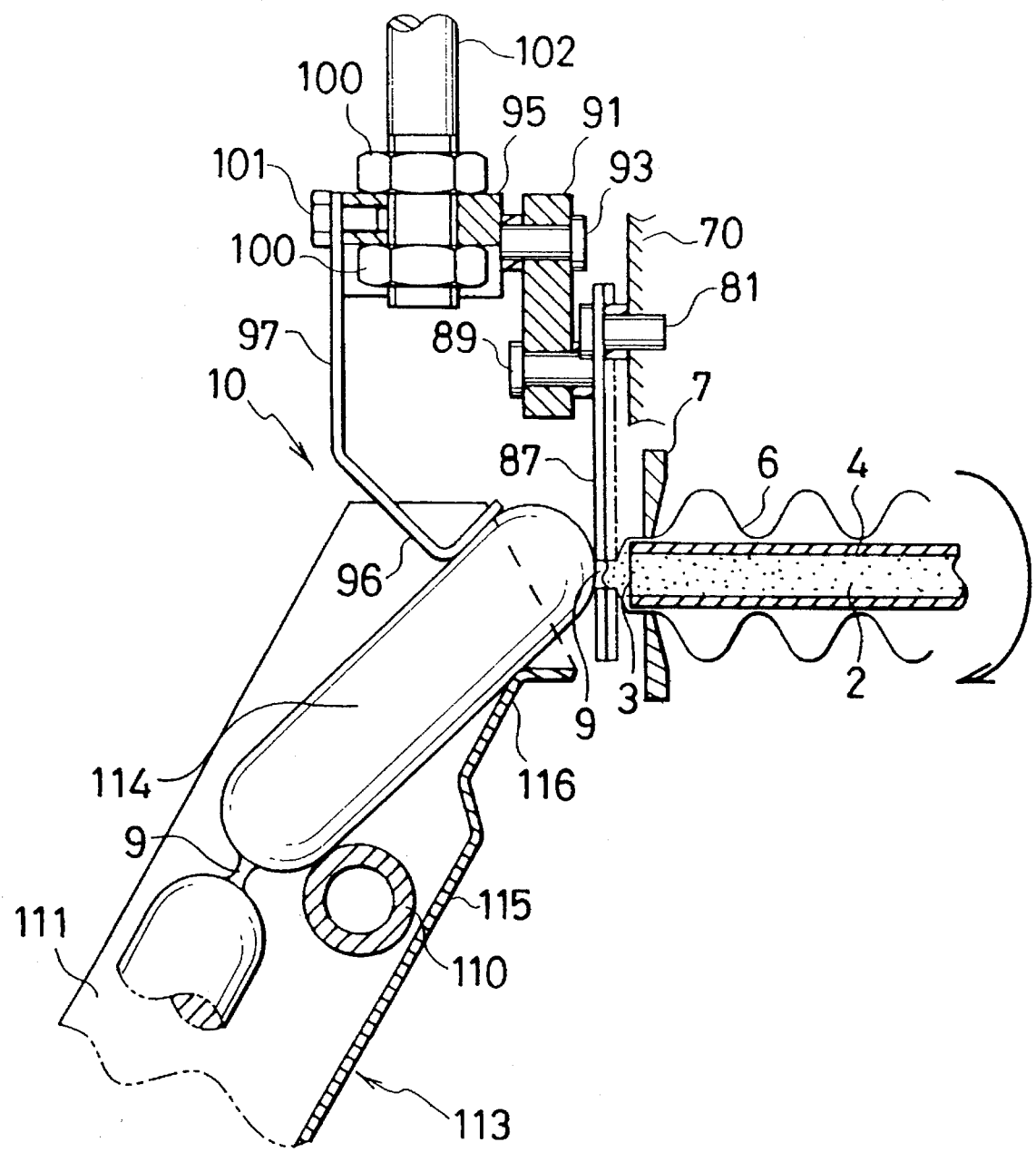
FIG. 13 is an explanatory diagram of the operation when the discharging of meat is stopped, as viewed from the side of the determining means in accordance with the embodiment shown in FIG. 1.

In the determining means 10 thus arranged, while the meat 2 supplied through the nozzle 4 by the material-supplying means 5 is being discharged from the material-discharging end 3 and is being filled in the sheep intestine 6, the pneumatic cylinder device 103 is not operated. Hence, the clamping plates 87 and 88 do not clamp the sheep intestine 6 released from the material-discharging end 3, nor does the pressing plate 97 press the sheep intestine 6 released from the material-discharging end 3, so that the clamping plates 87 and 88 and the pressing plate 97 are located at a nonclamping position and a nonpressing position, respectively, as shown in FIGS. 11 and 12. At this time, as for the sheep intestine 6, a sheep intestine 114 into which the meat is being filled is rotated by being dragged by the rotation of the nozzle 4, with the result that the twisting of two revolutions is replenished to the twisted portion 9 at the tip of the sheep intestine 114 being filled by the two revolutions of the nozzle 4 discharging the meat, thereby forming a complete twisted portion 9 which has undergone four revolutions. Next, when the controlling device 104 receives the detection electrical signal from the sensor 76, the pneumatic cylinder device 103 is actuated by the controlling device 104, and its piston rod 102 is extended. As a result, the clamping plates 87 and 88 are rotated about the pins 81 and 82, respectively, and the pressing plate 97 is moved toward the sheep intestine 6 released from the material-discharging end 3. Finally, as shown in FIG. 13, the distal-end clamping portions 83 and 84 of the clamping plates 87 and 88 clamp the sheep intestine 6 released from the material-discharging end 3, while the pressing portion 96 of the pressing plate 97 presses the sheep intestine 6 released from the material-discharging end 3. By virtue of the clamping and pressing which are synchronized with the intermittent supply of the meat 2 by this material-supplying means 5, the rotation of the sheep intestine 6 on the side thereof released from the material-discharging end 3, i.e., the sheep intestine 114 for which the filling of the meat has been completed, is reliably prevented. Consequently, the twisted portion 9 is formed reliably in the vicinity of the material-discharging end 3, with the result that the position of the twisted portion 9 is determined accurately. At this time, the sheep intestine 6 which has not yet been released from the material-discharging end 3 and still remains fitted over the nozzle 4 is rotated by being dragged by the rotation of the nozzle 4. Hence, an incomplete twisted portion 9 which has undergone two revolutions is formed at the trailing end of the filling-completed sheep intestine 114 by the two revolutions of the nozzle 4 from which the discharge of the meat is being stopped. Thereafter, the above-described operation is repeated, and the meat-containing sheep intestine 6, in which the completely twisted portions 9 which have undergone four revolutions are formed, is manufactured consecutively (see FIG. 26).

As illustrated if a chute 113 in which a plurality of rollers 110 are rotatably mounted between side walls 111 and 112 is provided for the bending means 73 to lead a portion (link portion) of the sheep intestine 6 containing the meat 2 in a downward direction via the chute 113, the rotation of the portion 114 pressed by the pressing plate 97 can be prevented more reliably in cooperation with a bottom plate 115 of the chute 113. As a result, the operation of the bending means 73 and, hence, the operation of the determining means 10 can be improved further. Further, in the bottom plate 115 of the chute 113, a portion 116 opposing the pressing portion 96 of the pressing plate 97 is made to project as shown, so as to clamp the portion (link portion) 114 by the portion 116 and the pressing portion 96 of the pressing plate 97, the above-described operation can take plate more effectively in some cases. Although the ease of twisting is determined by the producing center of the sheep intestines 6, the type of meat 2, and the like, in a case where twisting can be easily effected, the determining means 10 may be formed without using the bending means 73.

Figure 3:
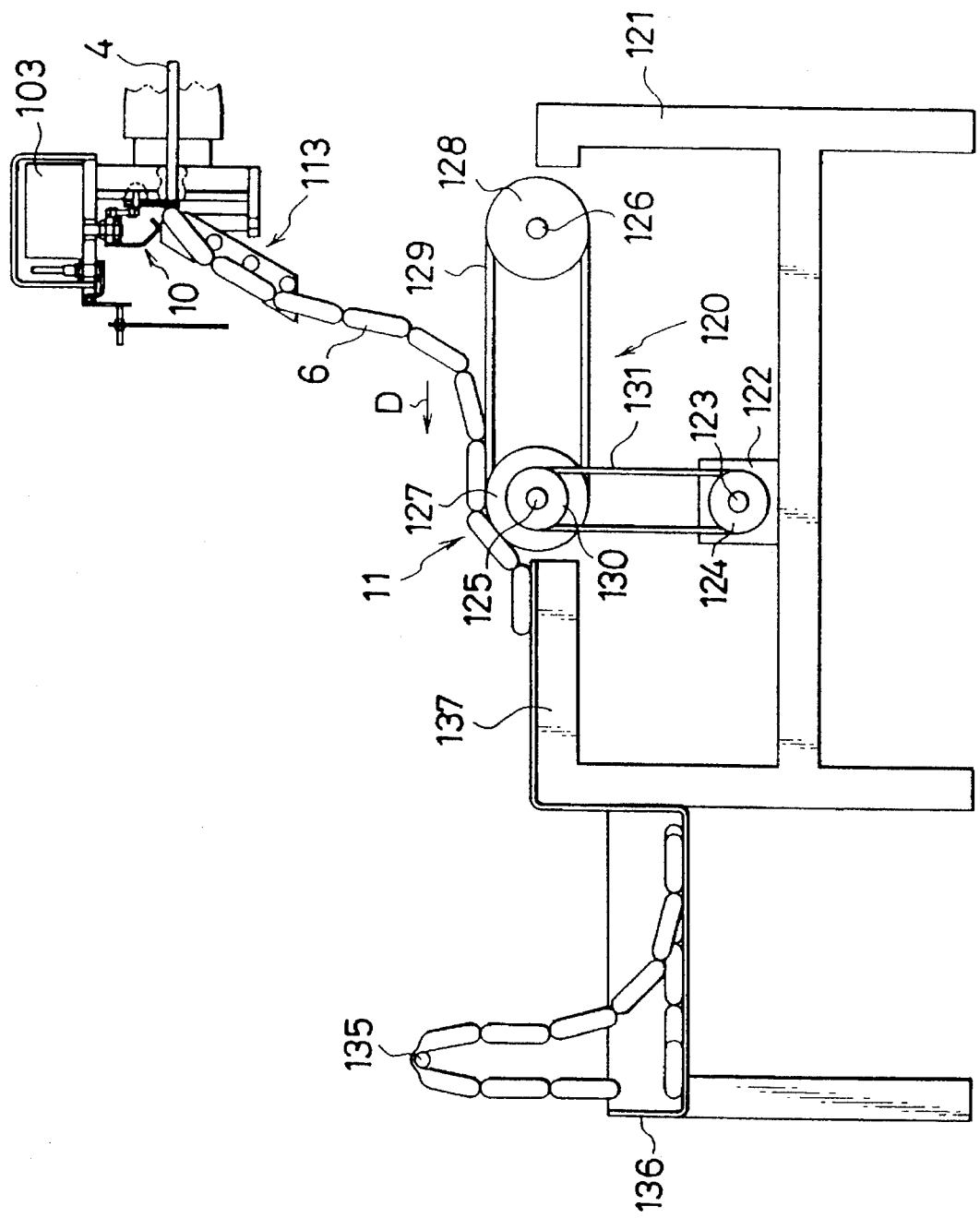
FIG. 3 is a side elevational view of a removing means in accordance with the embodiment shown in FIG. 1.

As shown in FIG. 3, the removing means 11 is provided with a transporting means 120 for receiving at a lower position spaced apart a predetermined distance from the material-discharging end 3 the sheep intestine 6 containing the meat 2, released and suspended from the material-discharging end 3 with the twisted portions 9 being consecutively formed (hereafter this sheep intestine will be referred to as the meat-containing sheep intestine 6 and for consecutively transporting the thus-received meat-containing sheep intestine 6 rectilinearly. The transporting means 120 is comprised of an electric motor 122 mounted on a frame 121; a pulley 124 attached to an output rotating shaft 123 of the electric motor 122; drive-side and driven-side drums 127 and 128 rotatably supported by the frame 121 via shafts 125 and 126, respectively; a conveyor belt 129 trained between the drums 127 and 128; a pulley 130 attached to the shaft 125; and a belt 131 trained between the pulleys 124 and 130. As the output rotating shaft 123 is rotated by the operation of the electric motor 122, the pulley 124, the belt 131, and the pulley 130 are rotated, which in turn causes the drum 127 to rotate. Consequently, the conveyor belt 129 is made to travel, and the meat-containing sheep intestine 6 received on the conveyor belt 129 is consecutively transported in the direction of D, and is fed to a temporary accumulating table 137 on the frame 121.

Since such a removing means 11 is provided, the meat-containing sheep intestine 6 released from the material-discharging end 3 is pulled appropriately by its own weight, so that the meat-containing sheep intestine 6 is pulled appropriately from the material-discharging end 3. In addition, it is possible to prevent a situation in which the meat-containing sheep intestine 6 remains in the vicinity of the material-discharging end 3 and the appropriate drawing out of the sheep intestine 6 from the nozzle 4 is hampered. Hence, it is possible to prevent the breakage of the sheep intestine 6. A work table 136 for suspending one meat-containing sheep intestine 6 from a smoking stick 135 is provided on the side of the removing means 11. The meat-containing sheep intestine 6 accumulated on the temporary accumulating table 137 is manually placed on the working table 136 by the operator, as necessary.

Figure 10:
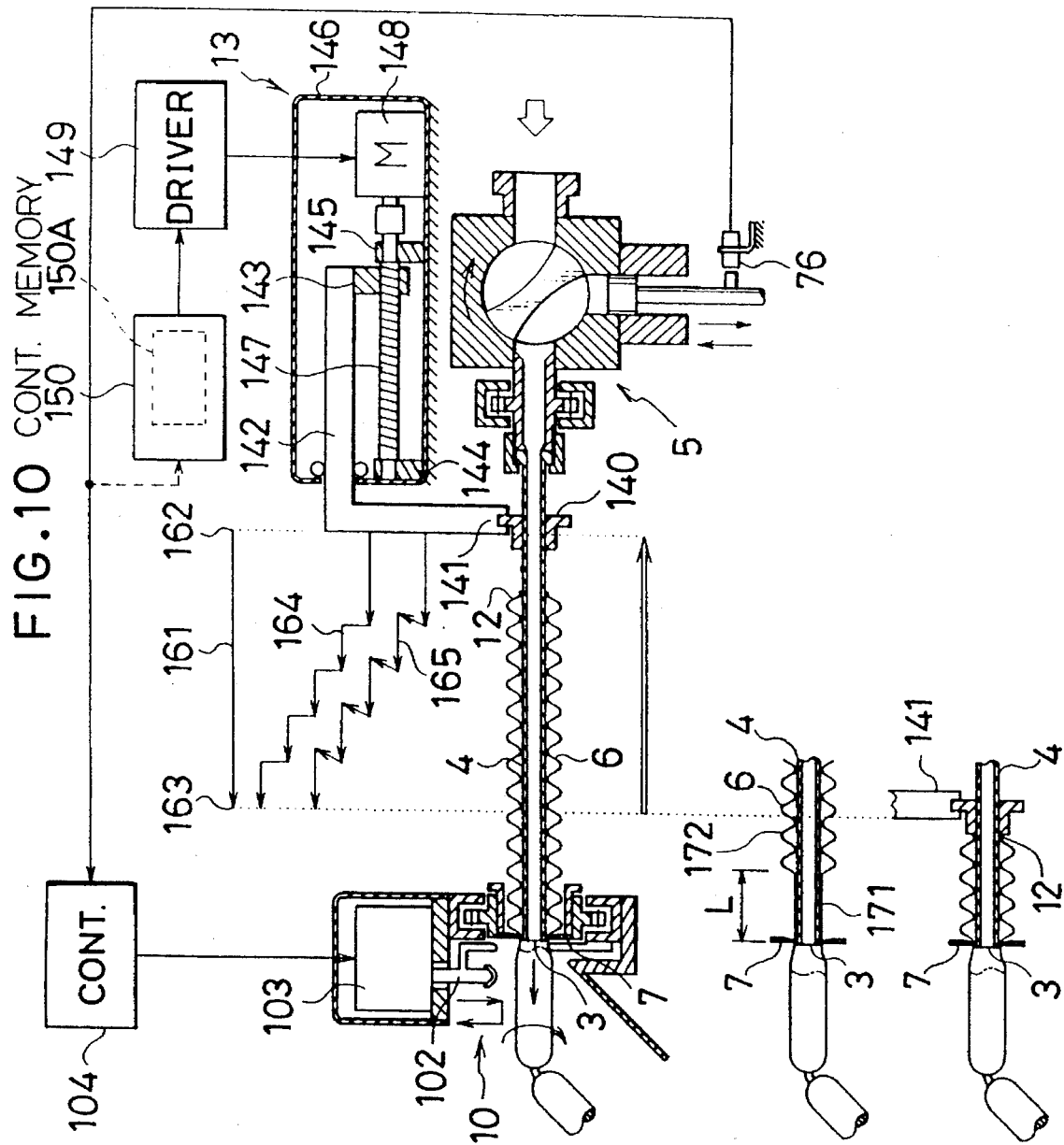
FIG. 10 is explanatory diagram of the operation of a controlled-pusher means in accordance with the embodiment shown in FIG. 1.

As shown in FIG. 10, the controlled-pusher means 13 is comprised of an intestine-pushing collar 140 fitted over the nozzle 4; a connecting member 142 which has one end 141 engaged with the intestine-pushing collar 140 and is disposed movably in the same direction as the direction in which the nozzle 4 extends; a screw shaft 147 which is threadedly engaged on another end 143 of the connecting member 142 and whose opposite ends are rotatably supported on a housing 146 via bearings 144 and 145, respectively; a servo motor 148 whose output rotating shaft is connected to one end of the screw shaft 147 and is disposed in the housing 146; a driver 149 for operating the motor 148; and a controlling device 150 for controlling the driver 149. The controlling device 150 has a storage means 150A for storing a pushing program in advance.

In the controlled-pusher means 13 thus arranged, the driver 149 operates the motor 148 in a state in which the operation is controlled by a pushing program stored in the storage means 150A. As the screw shaft 147 is rotated by the operation of the motor 148, the connecting member 142 is moved, with the result that the intestine-pushing collar 140 is also moved in the same direction. In a case where the intestine-pushing collar 140 is moved toward the material-discharging end 3, the trailing end 12 of the sheep intestine 6 is pushed by the intestine-pushing collar 140. This pushing of the trailing end 12 of the sheep intestine 6 promotes the movement of the sheep intestine 6 fitted over the nozzle 4 toward the material-discharging end 3 at a rate corresponding to the rate at which the sheep intestine 6 is released from the material-discharging end 3. Hence, since the resistance occurring when the sheep intestine 6 is released from the material-discharging end 3 can be maintained desirably, it is possible to favorably avoid such drawbacks as the breakage of the sheep intestine 6 due to being caught on the nozzle 4 and the occurrence of sausages of low resiliency.

Referring to FIG. 10, the pushing program may be formed as shown in a movement chart 161, a movement chart 164, or a movement chart 165. In the movement chart 161, one end 141 of the connecting member 142 is moved continuously at a fixed speed from a position 162 toward a position 163. In the movement chart 164, the end 141 of the connecting member 142 is moved from the position 162 toward the position 163 in such a manner that the end 141 is first moved by a large distance and, as necessary, at a fast speed so as to move the sheep intestine 6 toward the braking member 7 by a large distance immediately after the filling start, and the end 141 is then stopped for a fixed period each time the end 141 is advanced a fixed distance at a fixed speed. In the movement chart 165, the end 141 of the connecting member 142 is moved in such a manner that the end 141 is first moved from the position 162 toward the position 163 by a large distance and, as necessary, at a fast speed in the same way as in the movement chart 164, and the end 141 is then returned a fixed distance to separate the intestine-pushing collar 140 from the trailing end 12 of the intestine 6 each time the end 141 is advanced a fixed distance at a fixed speed. It should be noted that each pushing program is formed in such a manner that when the end 141 of the connecting member 142 reaches the position 163, the end 141 automatically returns to the position 162. Further, as shown in FIG. 10, in the sheep intestine 6 fitted over the nozzle 4, if the length L of an unshirred portion 171 occurring behind the braking member 7 becomes longer than it is necessary, the resistance of the sheep intestine 6 at the time of its release from the material-discharging end 3 increases, which possibly results in the breakage of the sheep intestine. Therefore, it suffices if the pushing program is prepared from the viewpoint of ensuing that the length L of the unshirred portion 171 located forwardly of a shirred portion 172 does not become longer than it is necessary, and that, conversely, the sheep intestine 6 is not pressed excessively against the braking member 7. Also, it suffices if an arrangement is provided such that when the end 141 of the connecting member 142 reaches the position 163, the operation of the material-supplying means 5 is stopped simultaneously or after being delayed by a portion corresponding to an estimated remaining amount of the sheep intestine 6 fitted over the nozzle 4, so as to stop the meat-discharging operation of the nozzle 4. Furthermore, as shown by the dotted line in FIG. 10, the detection electrical signal of the sensor 76 may be supplied to the controlling device 150 as well, so that the operation of the servo motor 148 may be controlled such that the moving speed of the connecting member 142 corresponds to the change in the rotational speed of the rotating shaft 25, i.e., the change in the meat-filling speed.

In addition to the above-described means, the apparatus 1 for manufacturing a chain of linked sausages or the like in this embodiment is further provided with an opening/closing means 200 for automatically opening and closing the housing 63 and a water-supplying means 201 for supplying water to the interior 15 of the nozzle 4.

Figure 9:
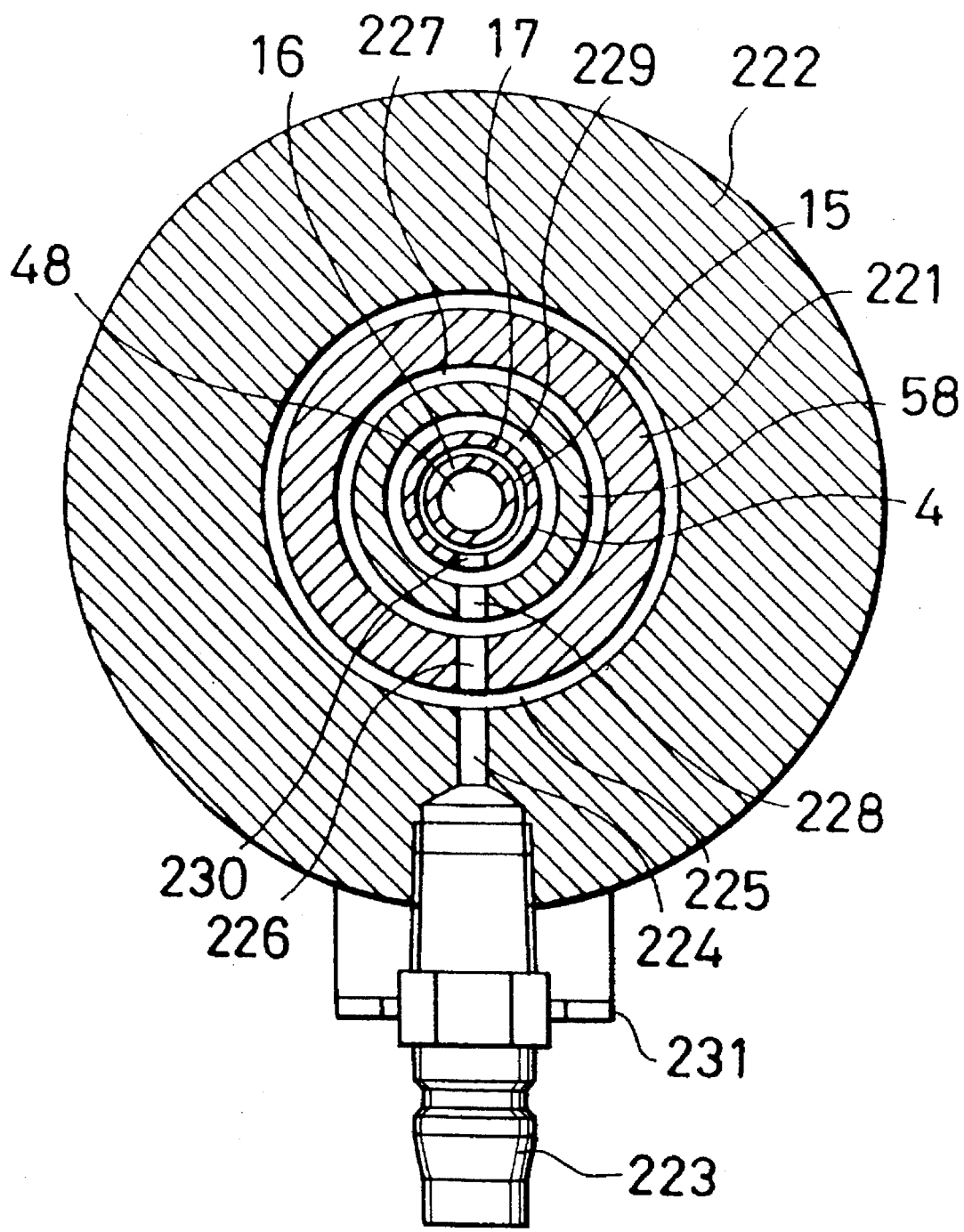
FIG. 9 is a cross-sectional view, taken along line IX—IX in FIG. 8, of the water supplying means shown in FIG. 8.

As shown in FIGS. 8 and 9, the water supplying means 201 is provided with an annular plug receiver 222 rotatably fitted over a cylinder 221 which is threadedly fitted to the cylinder 51 to prevent the nozzle 4 from coming off; and a plug 223 threadedly fitted to the plug receiver 222. A water supply pipe is connected to the plug 223, and a through hole 224, an annular recess 225, a through hole 226, an annular recess 227, a through hole 228, an annular recess 229, and a through hole 230 are formed in the plug receiver 222, the cylinders 221 and 58, and the outer cylinder 17 of the nozzle 4, respectively. The plug 223 and the cylindrical space 15 are made to communicate with each other by means of these through holes and recesses. When water is supplied to the plug 223, the water is supplied to the cylindrical space 15 through the through hole 224, annular recess 225, through hole 226, annular recess 227, through hole 228, annular recess 229, and through hole 230. Then, this water passes through the through holes 20 and is applied to the inner surface of the sheep intestine 6 fitted over the nozzle 4. As the water is applied to the inner surface of the sheep intestine 6, the sliding resistance between the sheep intestine 6 and the nozzle 4 can be reduced, so that the sheep intestine 6 fitted over the nozzle 4 can move over the nozzle 4 in a desired manner. Although water is used for the plug 223 in the above-described example, it is possible to use a fluid other than water. Further, a rotation-preventing member 231 having one end engaging with the plug 223 is mounted on the apparatus frame 55, and the rotation-preventing member 231 prevents the plug receiver 222 from being rotated by being dragged by the rotation of the nozzle 4. Depending on the magnitude of the sliding resistance between the sheep intestine 6 and the nozzle 4, it is possible to use a known nozzle in which water is not applied to the inner surface of the sheep intestine 6.

Furthermore, as shown in FIG. 6, the apparatus 1 for manufacturing a chain of linked sausages or the like in this embodiment further comprises a erupted-meat detecting means 236 consisting of a proximity switch 232 attached on the base 105 and a detecting element 235 swingably suspended from a shaft 234. In the erupted-meat detecting means 236, in the even that the sheep intestine 6 is ruptured, the meat 2 discharged from the material-discharging end 3 collides against the detecting element 235, and the detecting element 235 is thereby rotated, whereupon the proximity switch 232 detects the rotation of the detecting element 235, and a signal for stopping the meat-discharging operation is issued. As a result, the operation of the electric motor of the material-supplying means 5 is stopped.

In addition, the apparatus 1 for manufacturing a chain of linked sausages or the like in this embodiment further comprises an operation box 241. Provided in this operation box 241 are the driver 149, the controlling devices 104 and 150, and a controlling device for the erupted-meat detecting means which receives signals from the proximity switch 232 and a photosensor 261 (which will be described later) and instructs the starting and stopping of operation of the electric motor of the material-supplying means 5.

Figure 14:
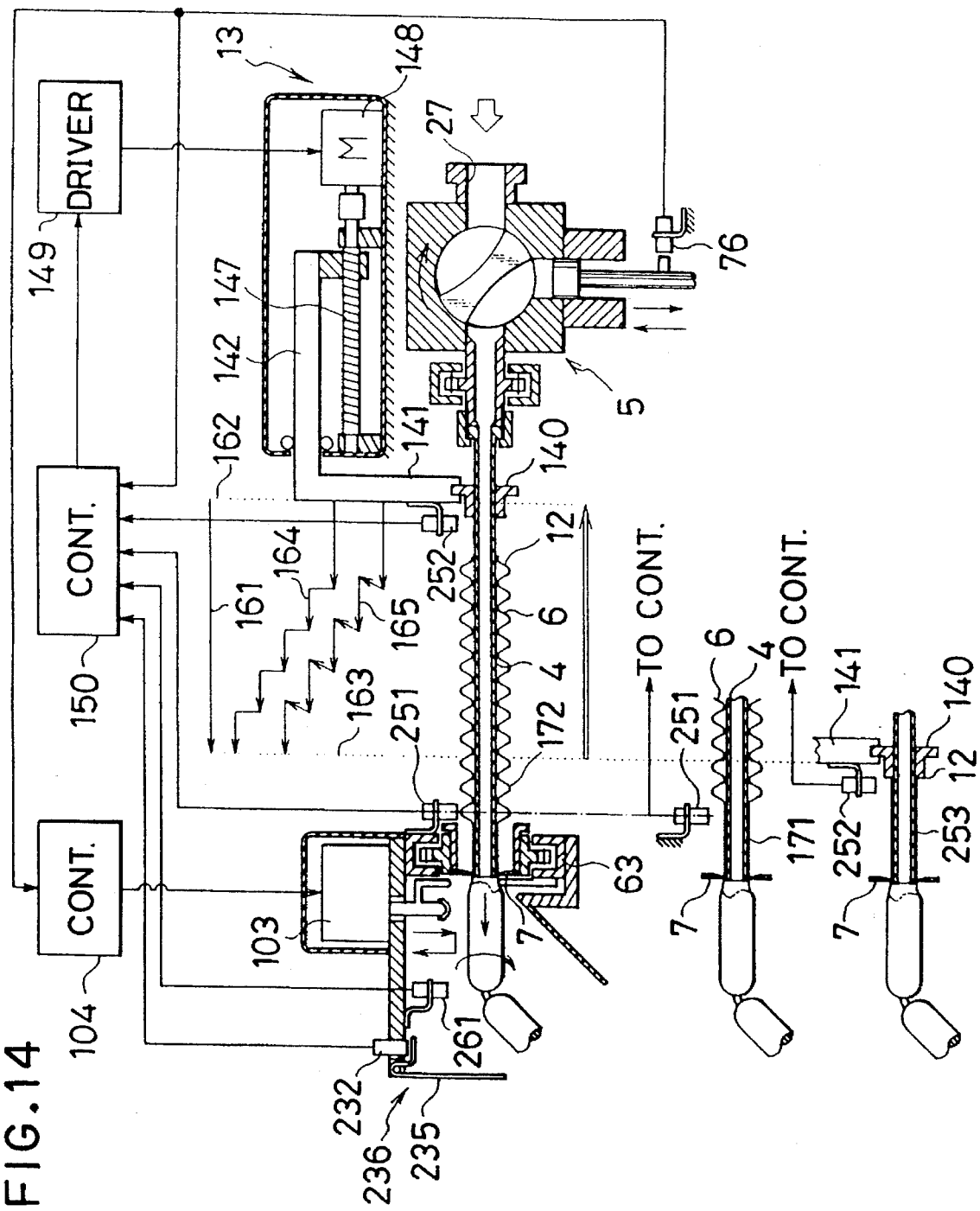
FIG. 14 is an explanatory diagram of the operation of another example of the controlled-pusher means of the present invention.

The above-described controlled-pusher means 13 is so arranged as to be operated in a state in which it is controlled on the basis of a pushing program. As shown in FIG. 14, the controlled-pusher means 13 may further comprise a photosensor 251 disposed on the housing 63 and serving as a detecting means for detecting the unshirred portion 171 which has undergone a change in the form of the sheep intestine 6 fitted over the nozzle 4 in the vicinity of the braking member 7, so as to press the trailing end 12 of the sheep intestine 6 via the intestine-pushing collar 140 on the basis of a detection signal from the photosensor 251. That is, in a case where the unshirred portion 171 of the sheep intestine 6 is not being detected by the photosensor 251, and the shirred portion 172 of the sheep intestine 6 is being detected, the controlling device 150 which receives a signal representing this state from the photosensor 251 does not issue a signal for operating the motor 148 to the driver 149.

As a result, since the motor 148 is not operated, the intestine-pushing collar 140 remains stopped. Meanwhile, in a case where the unshirred portion 171 of the sheep intestine 6 is being detected by the photosensor 251, the controlling device 150 which receives a signal representing this state from the photosensor 251 issues a signal for operating the motor 148 to the driver 149. As a result, since the motor 148 is operated, the intestine-pushing collar 140 moves in such a manner as to push the trailing end 12 of the sheep intestine 6 toward the material-discharging end 3. While the unshirred portion 171 of the sheep intestine 6 is being detected by the photosensor 251, the movement of one end 141 of the connecting member 142 for moving the intestine-pushing collar 140 may be effected as shown in the movement chart 161, the movement chart 164, or the movement chart 165. According to the movement chart 161, the end 141 of the connecting member 142 is moved continuously at a fixed speed from the position 162 toward the position 163. According to the movement chart 164, the end 141 of the connecting member 142 is moved in such a manner that the end 141 is moved from the position 162 toward the position 163 so as to first move the sheep intestine 6 toward the braking member 7 by a large distance and, as necessary, at a fast speed immediately after the filling start, and the end 141 is then stopped for a fixed period each time the end 141 is advanced a fixed distance at a fixed speed. According to the movement chart 165, the end 141 of the connecting member 142 is moved from the position 162 toward the position 163 in such a manner that the end 141 is first moved by a large distance and, as necessary, at a fast speed in the same way as in the movement chart 164, and the end 141 is then returned a fixed distance to separate the intestine-pushing collar 140 from the trailing end 12 of the intestine 6 each time the end 141 is advanced a fixed distance at a fixed speed.

In the above-described example, in the event that the shirred portion 172 of the sheep intestine 6 is detected by the photosensor 251, the operation of the motor 148 is preferentially stopped even when the end 141 of the connecting member 142 is moving, so as to stop the movement of the end 141 of the connecting member 142. Alternatively, an arrangement may be provided as follows: Even if the shirred portion 172 of the sheep intestine 6 is detected by the photosensor 251 when the one end 141 of the connecting member 142 is moving, this detection is ignored. When the shirred portion 172 of the sheep intestine 6 is detected by the photosensor 251 during the aforementioned stop of the end 141 for a fixed period according to the movement chart 164 or upon completion of the returning motion of the end 141 according to the movement chart 165, the operation of the motor 148 is stopped and the standstill of the end 141 of the connecting member 142 is continued until the unshirred portion 171 of the sheep intestine 6 is detected again by the photosensor 251. On the other hand, when the unshirred portion 171 of the sheep intestine 6 is being detected by the photosensor 251 during the aforementioned stop for a fixed period or upon completion of the returning motion, the movement of the end 141 of the connecting member 142 is continued on the basis of the movement chart 164 or 165.

Furthermore, a photosensor 252 which is equivalent to the photosensor 251, may be provided at the end 141 of the connecting member 142, as shown in FIG. 14. When the end 141 of the connecting member 142 is located at the position of a forward end, the photosensor 252 is used to detect an unshirred portion 253 occurring when most of the sheep intestine 6 has been used for meat filling, and the remaining portion of the sheep intestine 6 fitted over the nozzle 4 has become scarce. Upon receiving a signal representing the detection of the unshirred portion 253 from the photosensor 252, the controlling device 150 outputs a signal for stopping the operation to the material-supplying means 5 to stop the operation of the electric motor of the material-supplying means 5. The timing of the stopping of the operation of the electric motor of the material-supplying means 5 on the basis of the signal representing the detection of the unshirred portion 253 from the photosensor 252 may be adjusted by using a timer or the like. Further, an arrangement may be provided such that, when the signal representing the detection of the unshirred portion 253 from the photosensor 252 is received, the controlling device 150 outputs a signal for reversing the output rotating shaft of the motor 148 to the driver 149, so as to return the end 141 of the connecting member 142 for the intestine-pushing collar 140 to the position 162. Furthermore, a signal from the sensor 76 may be received by the controlling device 150, and the motor 148 may be driven in synchronism with the signal from this sensor 76.

The erupted-meat detecting means 236 may be further provided with the photosensor 261, as shown in FIG. 14, so as to detect erupted meat due to the breakage of the sheep intestine 6. This detection signal is supplied to the controlling device 150 to stop the operation of the material-supplying means 5 and the like when the eruption of the meat 2 has occurred due to the breakage of the sheep intestine 6. To increase the detection accuracy, two or more photosensors 261 may be disposed by being spaced apart a predetermined distance from each other, so as to stop the material-supplying means 5 when the photosensors 261 are issuing detection signals. As the sensor for detecting the erupted meat, it is possible to use various sensors such as an electrostatic sensor and a displacement sensor, in addition to the photosensor.

Figure 15:
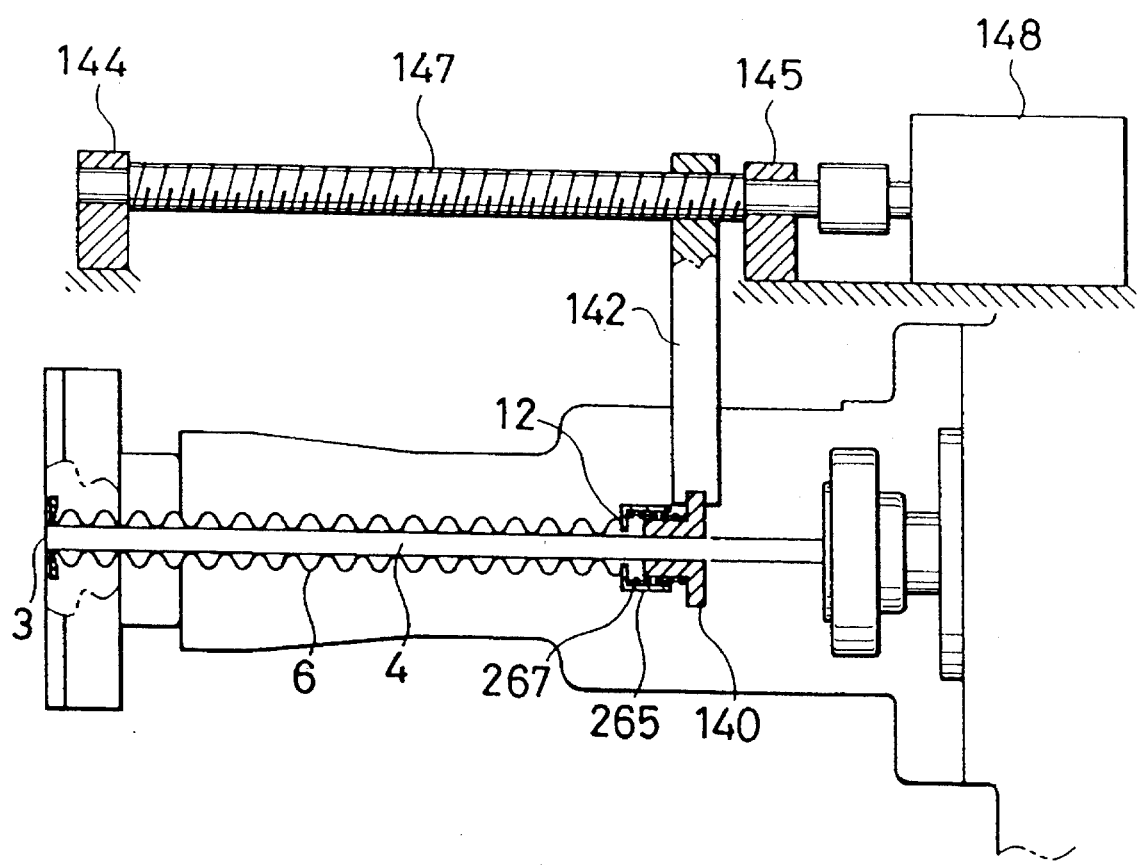
FIG. 15 is an explanatory diagram of the operation of still another example of the controlled-pusher means of the present invention.

Although, in the above-described example, the trailing end 12 of the sheep intestine 6 is directly pushed by the intestine-pushing collar 140, an arrangement may be alternatively provided such that, as shown in FIG. 15, a spring bracket 265 is fitted at the forward end of the intestine-pushing collar 140, and a coil spring 267 is disposed between the spring bracket 265 and the intestine-pushing collar 140, so as to press the trailing end 12 of the sheep intestine 6 via the coil spring 267. When the trailing end 12 of the sheep intestine 6 is pressed by using the resiliency of the coil spring 267, it may be possible to favorably avoid an undesirable situation in which the trailing end 12 of the sheep intestine 6 is forcibly pressed toward the material-discharging end 3, and the state in which the sheep intestine 6 is fitted over the nozzle 4 by being shrunk in an orderly arranged manner is disturbed, preventing the sheep intestine 6 from being moved smoothly toward the material-discharging end 3. It should be noted that, as the connecting member 142 having one end threadedly engaged with the screw shaft 147, a straight member such as the one shown in FIG. 15 may be used.

In the controlled-pusher means, there are suitable applications in the respective methods of controlling the operation of the connecting member 142. The operation of the chart 161 in FIG. 10 is suitable for a case where the overall lengths of the sheep intestines 6 used are substantially fixed. The operation of the chart 161 in FIG. 14 and the operation of the charts 164 and 165 in FIGS. 10 and 14 have no risk of pressing the sheep intestine 6 to an excess since the connecting member 142 is advanced intermittently. The retracting motion of the connecting member 142 in the operation of the chart 165 makes it possible to make uniform the shirring density of the shirred portion of the sheep intestine 6 and prevent the braking of the trailing end 12 of the sheep intestine 6 by the intestine-pushing collar 140. In the case of control in which the moving distance of the connecting member 142 is determined by the photosensor 251, even if the variation of the overall length of the sheep intestine 6 is very large, the variation can be permitted. The charts 161, 164, and 165 of this example which can be applied to the sheep intestines are effective in the case of collagen casings having low rigidity and cellulose casings having high rigidity. Desirable values are individually given for each step with respect to the moving distance and moving speed in each chart. The intestine-pushing collar 140 may be spaced apart from the end 141 when the connecting member 142 is retracted. The photosensors 251 and 252 detect a change in the form of the sheep intestine 6. The change in the form of the sheep intestine 6 referred to in the present invention includes changes from a shirred portion to an unshirred portion, from an unshirred portion to a shirred portion, from a portion of a large amount of shirr to a portion of a small amount of shirr, and from a portion of a small amount of shirr to a portion of a large amount of shirr, respectively. The change in the form referred to in the present invention also includes a change from a shirred portion or a unshirred portion toward the nozzle 4 side, and a change from the nozzle 4 side toward a shirred portion or an unshirred portion. The photosensor 252 may not be mounted on the connecting member 142, and may be secured to the housing 63, for instance. In this case, the photosensor 252 is preferably secured at a position for detecting the trailing end 12 of the sheep intestine 6 when the connecting member 142 is located at the forward end. The photosensor 252 can be replaced by the photosensor 251. That is, the photosensor 251 may detect the trailing end 12 of the sheep intestine 6, and output a signal for stopping the material-supplying means 5 to the controlling device 150. The photosensors 251 and 252 may be replaced by other sensors such as electrostatic sensors, displacement sensors, or the like.

Further, instead of the movement of the connecting member 142 by means of the screw shaft 147, the connecting member 142 may be moved by using a timing belt and pulleys. In addition, a controlling motor such as a stepping motor may be used instead of the servo motor.

Figure 16:
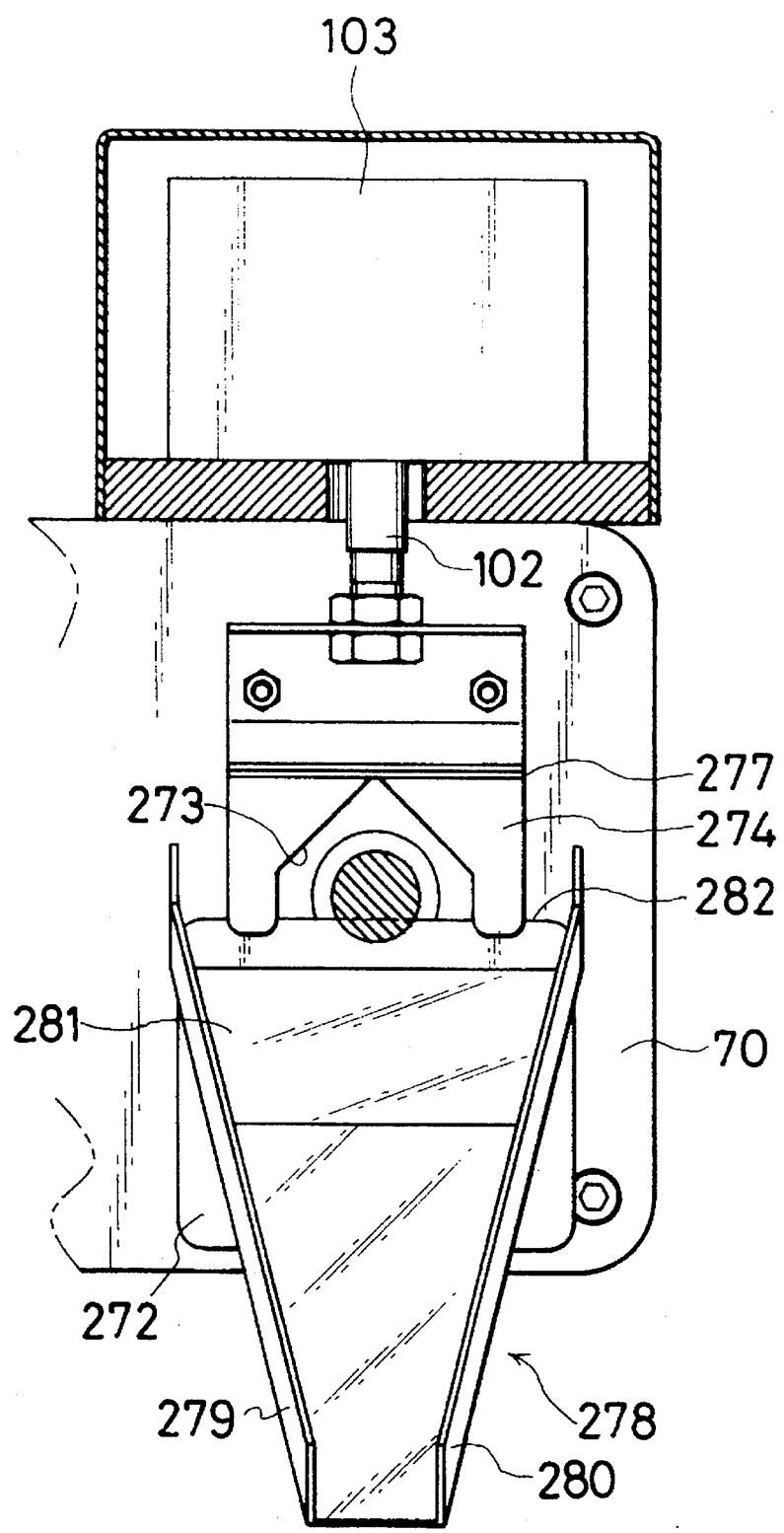
FIG. 16 is a front elevational view of another example of the determining means of the present invention.
Figure 17:
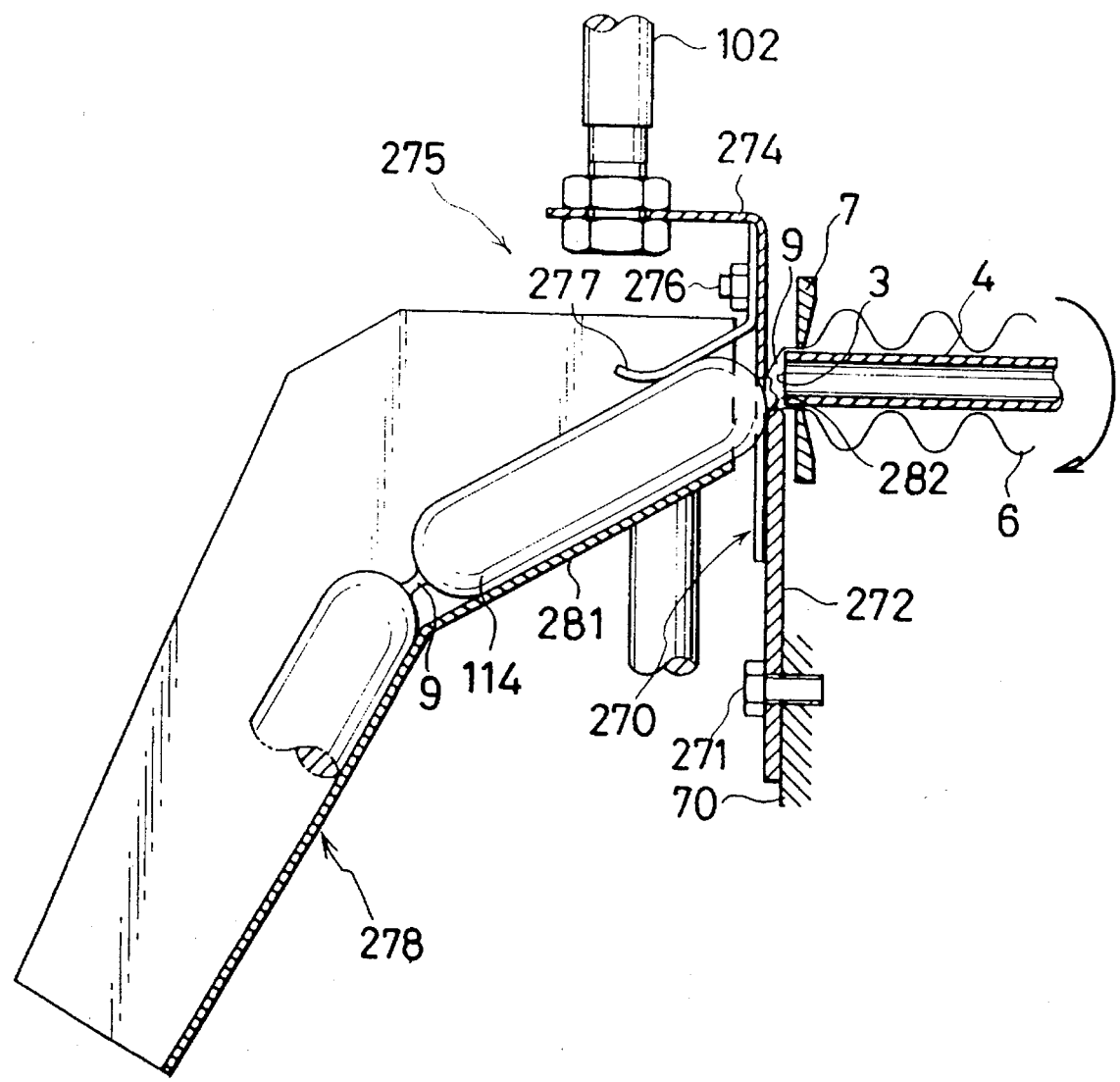
FIG. 17 is an explanatory diagram of the operation when the discharging of meat is stopped, as viewed from the side of the determining means of the example shown in FIG. 16.

The determining means comprised of the clamping means and the bending means may be formed as shown in FIGS. 16 and 17. In this example, a clamping means 270 is provided with a fixed plate 272 secured to the cover 70 by means of screws 271 and a movable plate 274 attached to the piston rod 102 and having a V-shaped notch 273 formed therein. A bending means 275 is provided with a pressing plate 277 secured to the movable plate 274 by means of nuts 276. A chute 278 in this example has a pair of side walls 279 and 280 opposing each other and approaching each other toward lower ends thereof, and a bottom plate 281 extending substantially in parallel with the pressing plate 277.

The determining means of this example, which is provided with the clamping means 270 and the bending means 275, operates in a manner similar to that of the above-described determining means 10. When the piston rod 102 is not extended, the sheep intestine 6 is not clamped by the clamping means 270, nor is it bent by the bending means 275, and the sheep intestine 114 undergoes two revolutions to impart supplementary twisting to the twisted portion 9. Meanwhile, when the piston rod 102 is extended, as shown in FIG. 17, the sheep intestine 6 is clamped as the movable plate 274 of the clamping means 270 is lowered, and the sheep intestine 114 is bent downward by the pressing plate 277 of the bending means 275, while a new twisted portion 9 is determined in the vicinity of the material-discharging end 3 and is formed by undergoing two revolutions. In this example, since clamping is effected by an upper edge 282 of the fixed plate 272 and edges at the V-shaped notch 273 of the movable plate 274, the wild movement of the twisted portion 9 which is newly formed by clamping can be eliminated, so that the position of the twisted portion 9 can be determined more accurately.

In the above-described example, although the fixed plate 272 having a straight upper edge is used, it is instead possible to provide a fixed plate having a V-shaped notch at an upper edge thereof. Thus the shapes of the fixed plate 272 and the movable plate 274 can be respectively selected appropriately, as desired.

Furthermore, in the determining means having the clamping means and the bending means, the clamping means 270 and the bending means 275 may be disposed below the nozzle 4. Namely, the clamping means 270 and the bending means 275 are raised, and the sheep intestine 114 is thereby bent upward and clamped, so as to determine the position of the twisted portion 9.

Figure 18A:
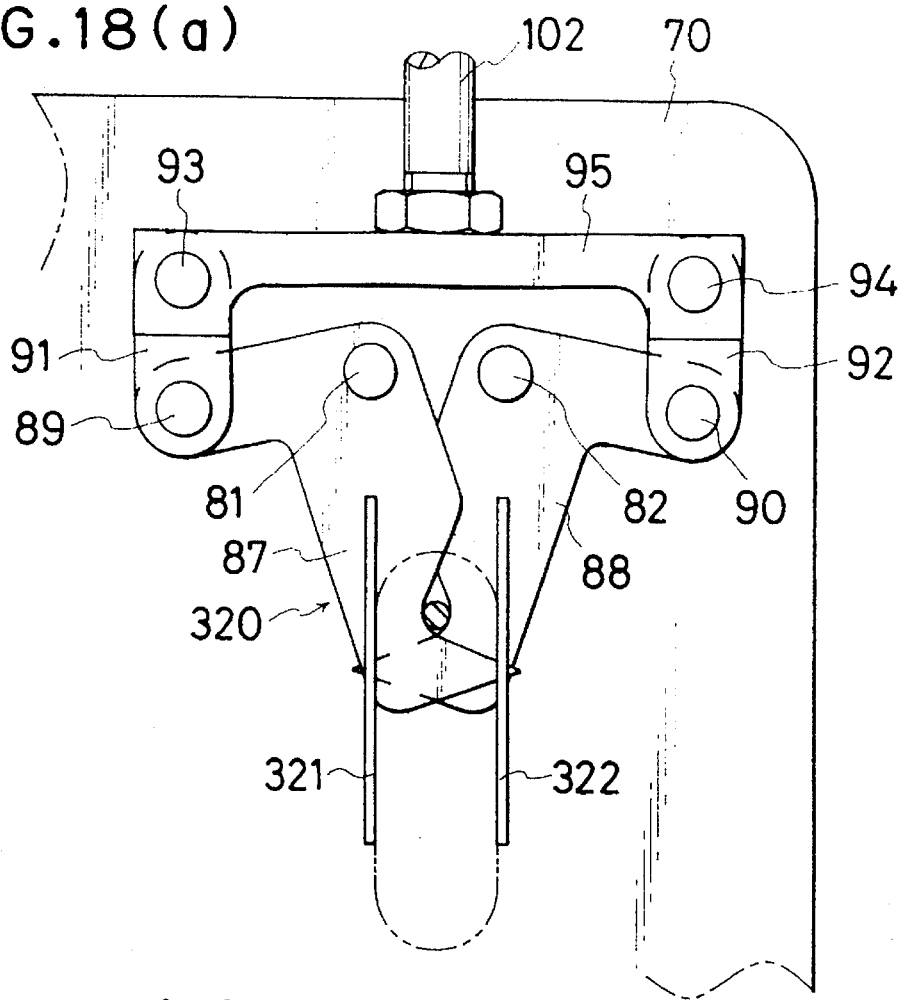
FIG. 18A is a front elevational view of still another example of the determining means of the present invention when the discharging of meat is stopped.
Figure 18B:
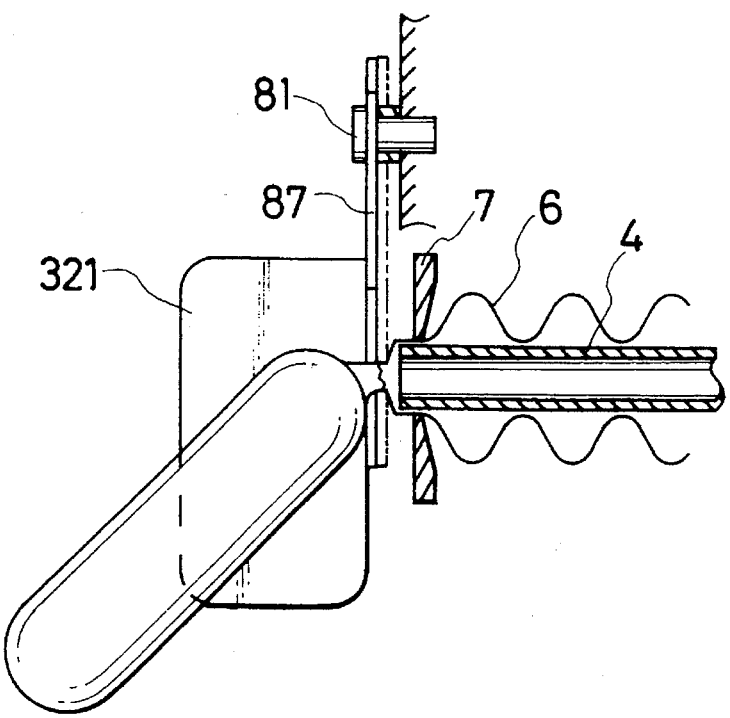
FIG. 18(b) is a side elevational view of the determining means of the example shown in FIG. 18(a)
Figure 19:
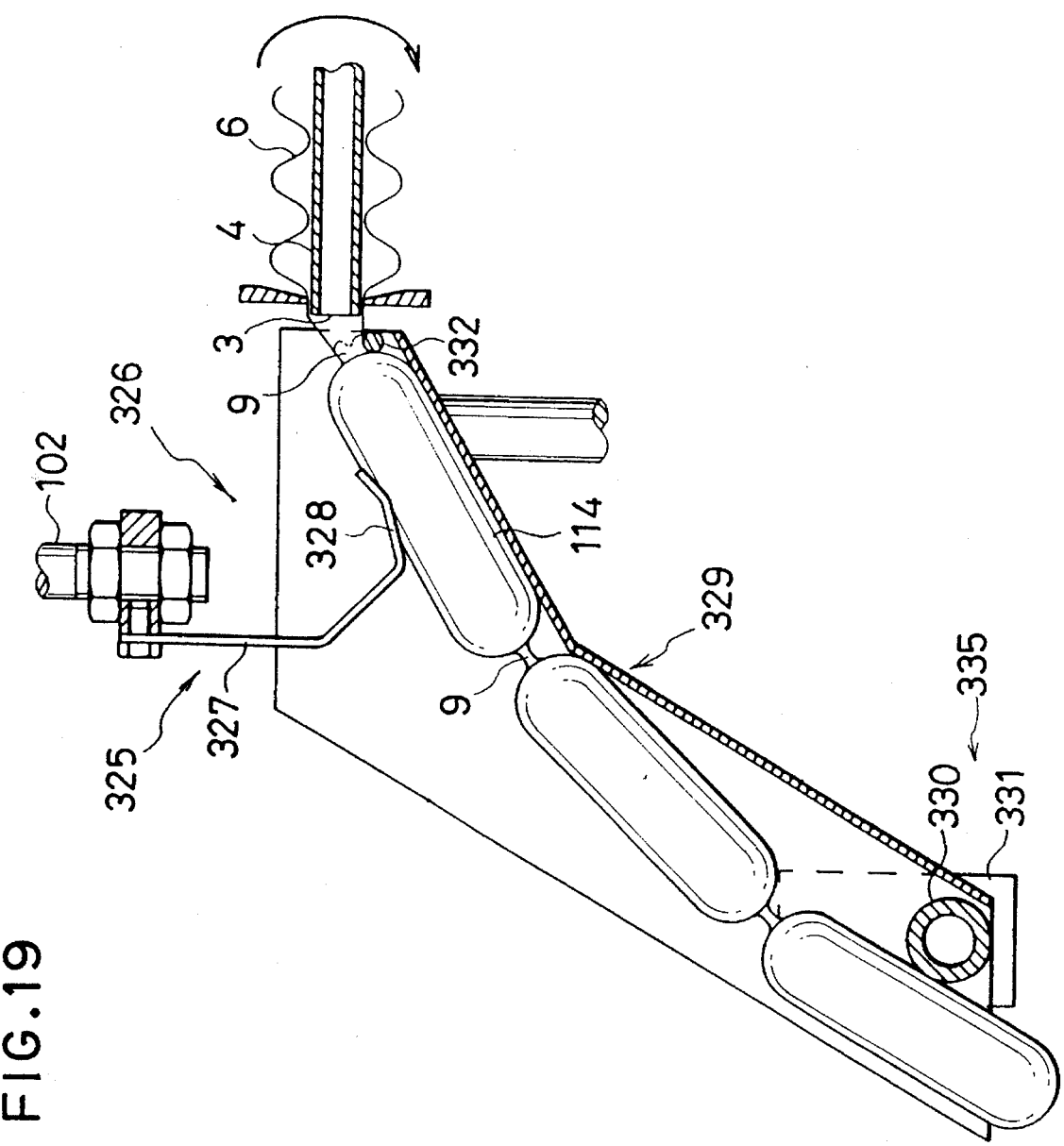
FIG. 19 is a side elevational view of a further example of the determining means of the present invention when the discharging of meat is stopped.

Although, in the above-described determining means, the twisting position is determined through cooperation between the clamping means and the bending means, the present invention is not limited to this arrangement. For instance, the determining means may be formed by the clamping means alone, as shown in FIG. 18, or by the bending means alone, as shown in FIG. 19. Namely, a determining means 320 of this example shown in FIG. 18 is formed in a manner similar to that of the aforementioned clamping means 72 except that it has holding members 321 and 322 respectively secured to the clamping plates 87 and 88. Accordingly, the determining means 320 operates in the same way as the clamping means 72. The holding members 321 and 322 prevent the rotation of the meat-filled sheep intestine 6 and reliably cause the twisted portion 9 to undergo twisting of two revolutions when the sheep intestine 6 is clamped by the clamping plates 87 and 88. In addition, the holding members 321 and 322 operate in such a manner as to prevent the wild movement of the meatfilled sheep intestine 6. In a case where the determining means 320 is thus arranged by the clamping means 72 alone, it is preferable to juxtapose a preventing means for preventing the rotation of the meat-filled sheep intestine 6, but the preventing means may not necessarily be provided. Meanwhile, a determining means 325 shown in FIG. 19 has a bending means 326 formed in a manner similar to that of the aforementioned bending means 73, and a pressing plate 327 of the bending means 326 has a pressing portion 328 formed by being bent twice. A chute 329 has a horizontal bar 332 bridging both side walls in the vicinity of the material-discharging end 3.

The determining means 325 of this example operates in a manner similar to that of the aforementioned bending means 73, and when the piston rod 102 is not extended, the sheep intestine 114 is not bent by the bending means 326, and the sheep intestine 114 is made to undergo two revolutions to impart supplementary twisting to the twisted portion 9. Meanwhile, when the piston rod 102 is extended, as shown in FIG. 19, the sheep intestine 6 is bent downward as the pressing plate 327 is lowered, so that a new twisted portion 9 is determined at the material-discharging end 3 and is formed by undergoing two revolutions. When the twisted portion 9 is determined, the sheep intestine 6 is bent downward at the position of the material-discharging end 3 of the nozzle 4, so that the formation of the twisted portion 9 is facilitated. In addition, since the horizontal bar 332 lies below this newly twisted portion 9, the formation of the twisted portion can be effected reliably and easily at a proper position. It should be noted that, as the removing means, it is possible to use a removing means 335 which is arranged as follows: As shown in FIG. 19, a roller is provided rotatably between both side walls of the chute 329, and the roller 330 is, by an electric motor 331 mounted on the side wall, rotated continuously or rotated intermittently in synchronism with the discharging of the meat from the material-discharging end 3 in such a manner as to rotate only during the discharging of the meat, thereby promoting the transfer of the meat-filled sheep intestine 6 in the downward direction.

Figure 20:
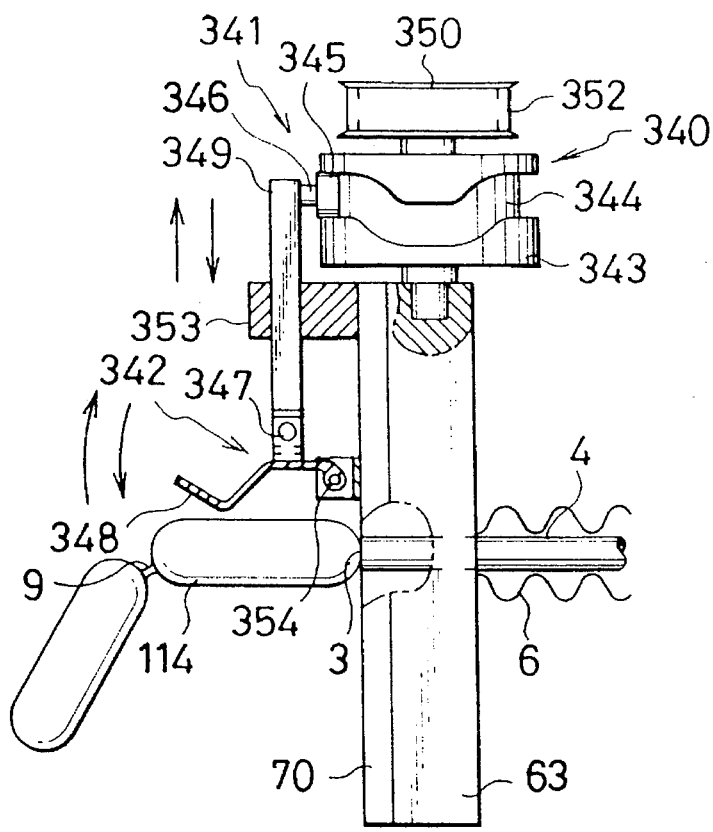
FIG. 20 is a side elevational view of a still further example of the determining means of the present invention.
Figure 21:
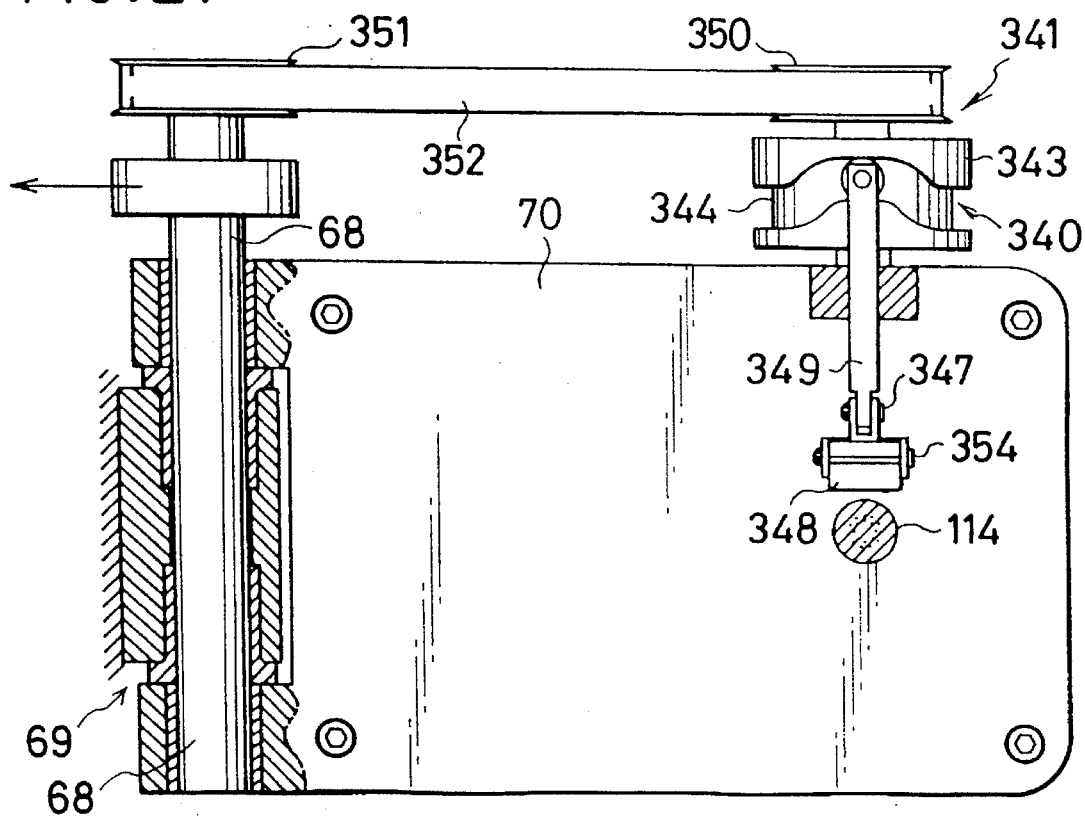
FIG. 21 is a front elevational view of the determining means of the example shown in FIG. 20.

Although in the above example a description has been given of the determining means provided with the pneumatic cylinder device 103, in the present invention, instead of such a determining means it is possible to use a determining means 341 provided with a cam mechanism 340, as shown in FIGS. 20 and 21. The determining means 341 of this example is constituted by a bending means 342 provided with the cam mechanism 340; however, it goes without saying that the clamping means may be juxtaposed by sharing the cam mechanism 340, as described above, and that the determining means may be constituted by only the clamping means provided with the cam mechanism 340 as in this example. The cam mechanism 340 is comprised of a cam 343 inserted rotatably in the housing 63, a roller 345 disposed in a cam groove 344 in the cam 343, and a connecting member 349 having one end to which the roller 345 is rotatably attached via a shaft 346 and another end to which a pressing member 348 is rotatably coupled via a shaft 347. A pulley 350 is mounted on the cam 343, and a belt 352 is trained between the pulley 350 and a pulley 351 mounted on the shaft 68 of the hinge mechanism 69. The shaft 68 is coupled to the output rotating shaft of the electric motor of the aforementioned material-supplying means 5 via an unillustrated transmitting mechanism, and the connecting member 349 is supported by the support member 353 affixed to the cover 70, in such a manner as to be vertically movable.

In the determining means 341 of this example, the cam mechanism 340 corresponds to the pneumatic cylinder device 103 of the above-described example, and the pulley 350, the pulley 351, the belt 352, and an unillustrated transmitting mechanism connected to the output rotating shaft of the electric motor of the material-supplying means 5 correspond to the detecting means 71 in the above-described example. Accordingly, in the present invention, as the detection signal it is possible to use a mechanical signal of such as a rotating force obtained from the output rotating shaft of the electric motor of such a material-supplying means 5. The pressing member 348 is rotatably attached to the cover 70 via a shaft 354, and is swung in a oscillating manner by the rotation of the cam 343.

In the determining means 341 of this example which is arranged as described above, the cam 343 is rotated in synchronism with the rotation of the output rotating shaft of the electric motor of the material-supplying means 5, with the result that the pressing member 348 is swung in synchronism with that rotation. As such, when the meat 2 is being discharged into the sheep intestine 6 from the material-discharging end 3, the roller 345 is raised by being guided by the cam groove 344, so that the pressing member 348 remains rotated substantially in a horizontal position, as shown in FIG. 20, so as not to press the sheep intestine 6 into which the meat 2 is being filled. At the same time, twisting of two revolutions is further imparted to the twisted portion 9 which has already undergone twisting of two revolutions at the distal end of the sheep intestine 6 which is being filled. On the other hand, when the discharging of the meat 2 from the material-discharging end 3 is being stopped, the roller 345 is lowered by being guided by the cam groove 344, so that the pressing member 348 is rotated downward, presses the sheep intestine 6 for which meat filling has been virtually completed, i.e., the sheep intestine 114, and bends the sheep intestine 6 in the immediate vicinity of the material-discharging end 3 to produce the twisted portion 9 at the bent portion, thereby determining the position of twisting. At the same time, the pressing member 348 is brought into frictional contact with the sheep intestine 114 in such a manner as to prevent the rotation of the sheep intestine 114. Twisting of two revolutions is imparted to the twisted portion 9 thus determined.

Meanwhile, although the removing means 11 shown in FIG. 3 is formed by using the conveyor belt 129, a removing means provided with a transporting means consisting of a turntable and the like may be formed alternatively.

In the above, a description has been given of an example of the removing means provided with a transporting means for receiving at a lower position spaced apart a predetermined distance from the material-discharging end the meat-containing sheep intestine released and suspended from the material-discharging end by its own weight and for consecutively transporting the meat-containing sheep intestine thus received. However, a removing means may be formed which is provided with a looping and transferring means 770 serving as a transporting means for consecutively transporting the sheep intestine 6 containing the meat and released from the material-discharging end 3, in a direction intersecting the axis of the nozzle 4, i.e., in a horizontal direction perpendicular to the axis of the nozzle 4 in this example, as shown in FIGS. 22 to 25.

In FIGS. 22 to 25, the looping and transferring means 770 in this example is comprised of the following: a shaft 772 supported rotatably on a frame 771; a pair of drive-side toothed wheels 773 and 774 secured to one end of the shaft 772; a pair of driven-side toothed wheels 775 and 776 supported rotatably on the frame 771; an upper endless chain 777 trained between the wheels 773 and 775; a lower endless chain 778 trained between the wheels 774 and 776; a multiplicity of upper hooks 779 respectively disposed on the chain 777 via equal intervals in the direction of travel of the chain 777 via screws or the like; a multiplicity of lower hooks 780 respectively disposed on the chain 778 at equal intervals in the direction of travel of the chain 778 via screws, brackets or the like; a servo motor 781 whose output rotating shaft is coupled to the shaft 772; a detector 783 for detecting a detecting element 782 attached to the output rotating shaft of the servo motor 781; a controlling device 784 which receives a detection signal from the detector 783 and a detection signal from the sensor 76 of the detecting means 71, outputs a signal for operating the servo motor upon receiving six detection signals from the sensor 76, and, after outputting the motor operating signal, outputs a motor stopping signal upon subsequently receiving a detection signal generated from the detector 783 for each 90° rotation of the output rotating shaft of the servo motor 781; a driver 785 for driving the servo motor 781 on the basis of the motor operating signal and the motor stopping signal from the controlling device 784; and a smoking stick device 789 having, among others, an inclined table 787 for storing a multiplicity of smoking sticks 786 and a transfer member 788 for transferring one at a time the smoking sticks 786 stored on the inclined table 787 onto the hooks 780.

Each hook 779 has a proximal portion 800 and a pair of hook portions 801 and 802 which are respectively attached to the proximal portion 800 for catching the twisted portion 9 and suspending the meat-filled sheep intestine 6 therefrom. In the meat-filled sheep intestine 6 suspended in the form of a loop, a smoking-stick insertion space 803 is formed by the pair of hook portions 801 and 802. Immediately after an incomplete twisting of two revolutions is formed in the twisted portion 9 by the clamping of the sheep intestine 6 by the clamping means 320 in the vicinity of the material-discharging end 3, the hook 779 catches the complete twisted portion 9 which has already been formed one link forwardly of that twisted portion 9, and the hook 779 effects this operation with respect to every sixth twisted portion 9.

Although the smoking stick-supplying device 789 is not illustrated in detail, the device disclosed in Japanese Patent Laid-Open No. 219334/1988 may be preferably used.

Figure 22:
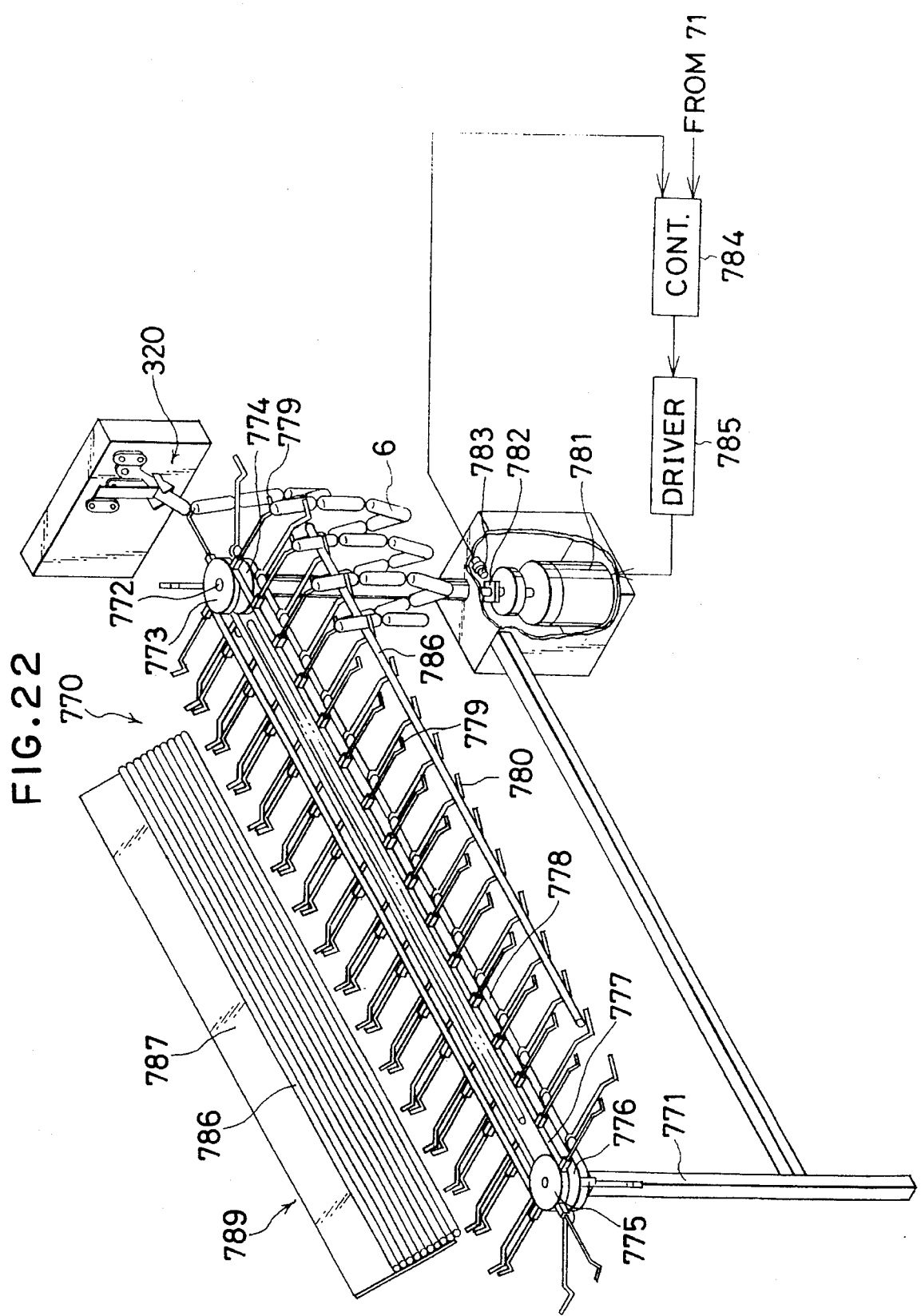
FIG. 22 is a side elevational view of another example of the removing means of the present invention.
Figure 23:
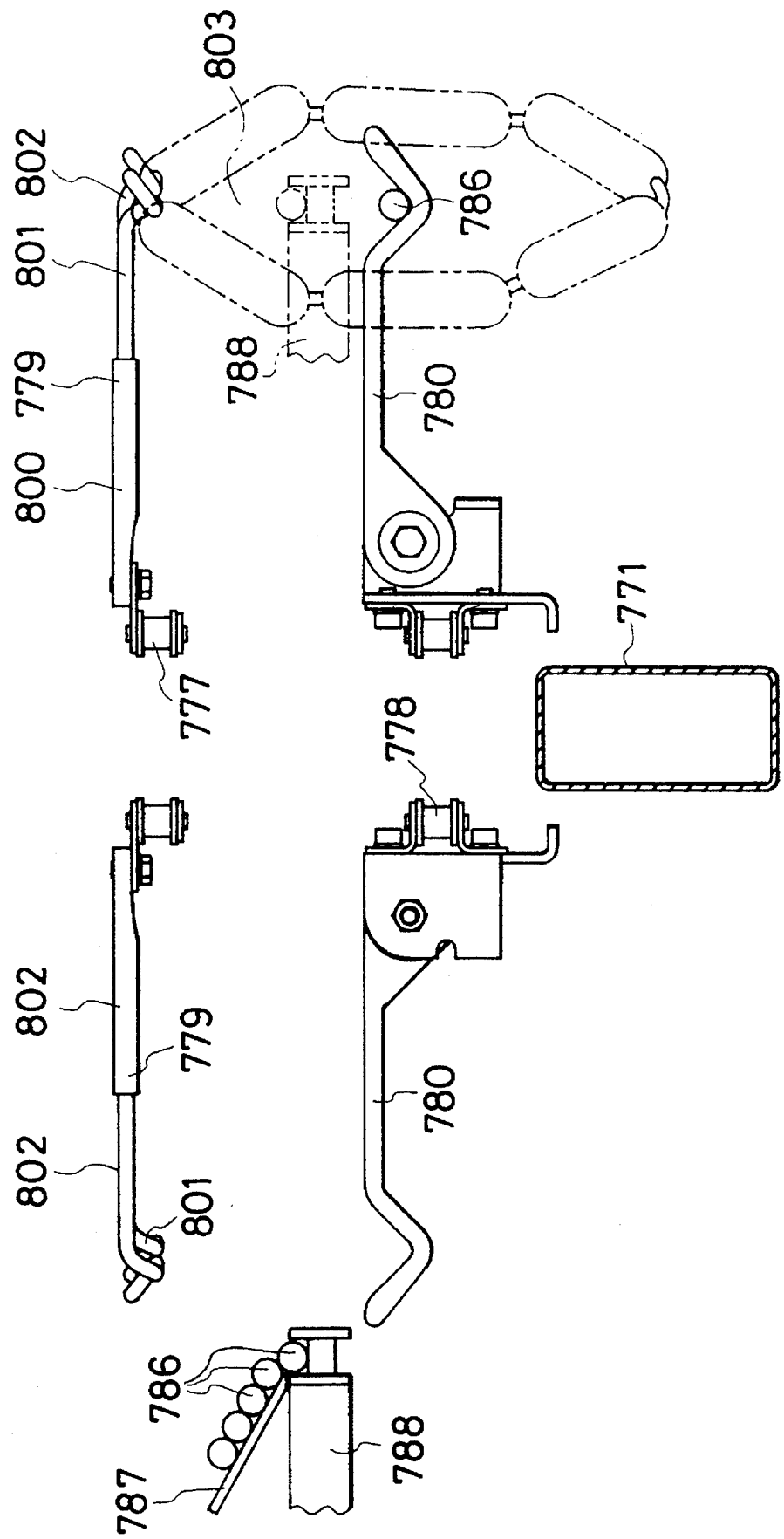
FIG. 23 is a partial cross-sectional view of the removing means of the example shown in FIG. 22.
Figure 24:
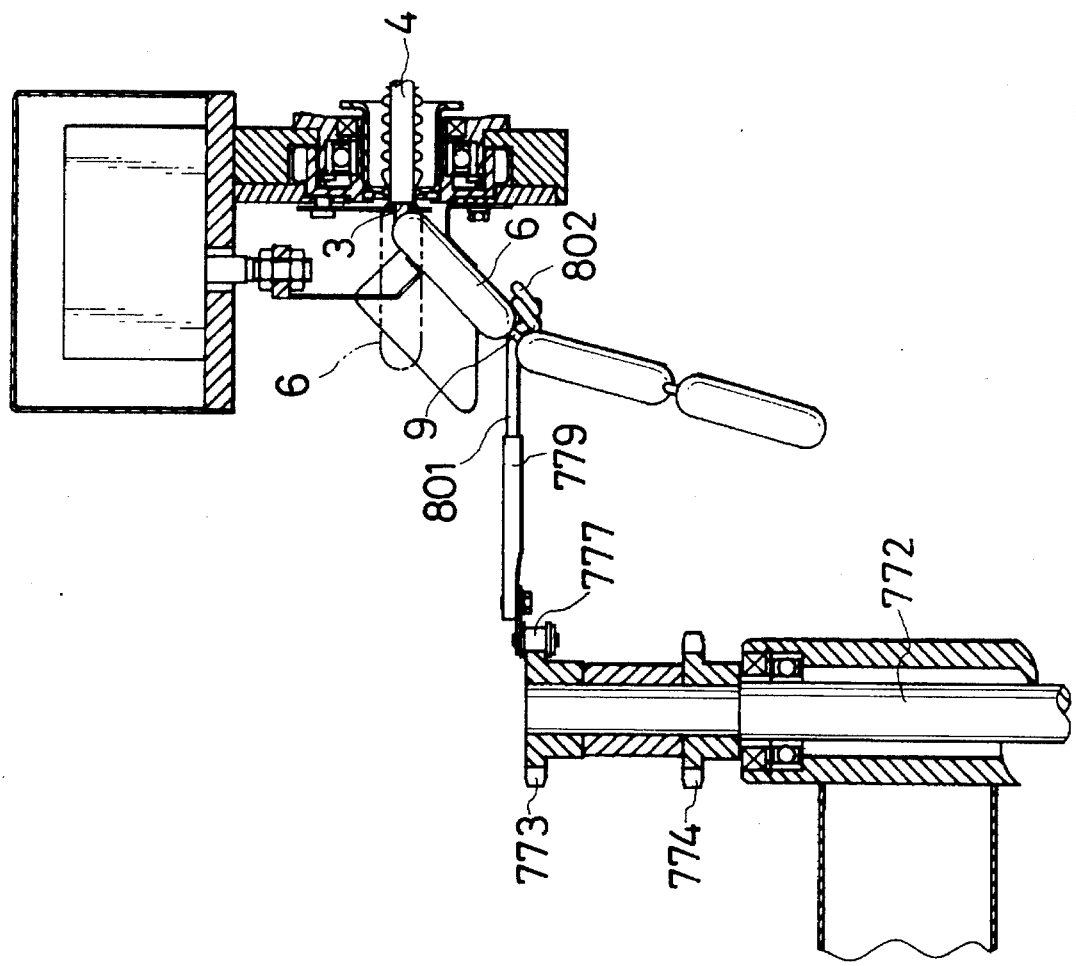
FIG. 24 is an explanatory diagram of the operation of the removing means of the example shown in FIG. 22.
Figure 25:
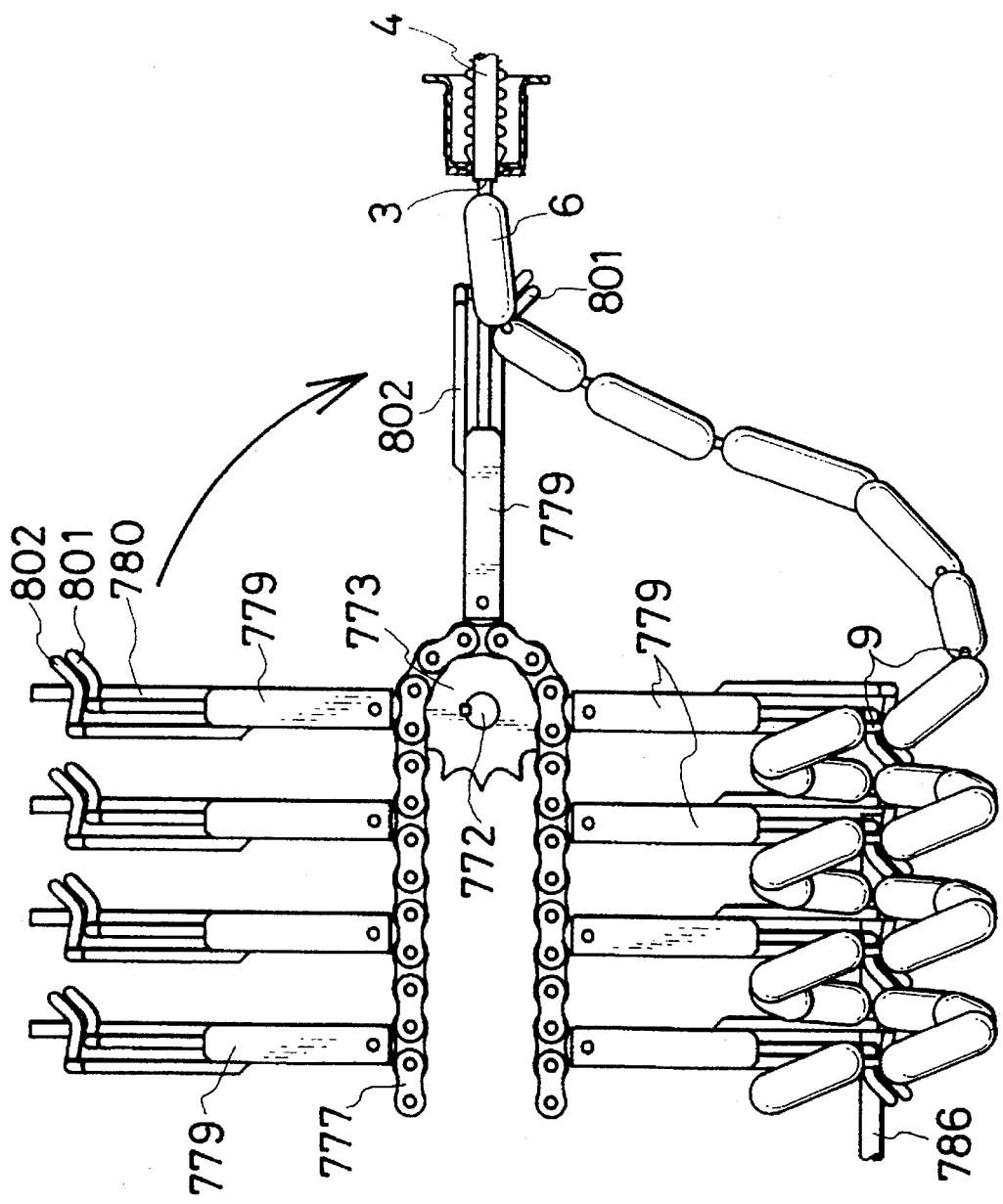
FIG. 25 is a plan view of a part of the removing means of the example shown in FIG. 22.

Although, in FIG. 22, each of the upper hooks 779 and each of the lower hooks 780 corresponding to the same are illustrated as not overlapping in the vertical direction to facilitate an understanding of this example, these hooks are arranged in such a manner as to substantially overlap in the vertical direction, as shown in FIG. 25.

In the looping and transferring means 770 arranged as described above, when the output rotating shaft of the servo motor 781 rotates, the hooks 779 and 780 are also moved by the chains 777 and 778. During the movement of the hooks 779, the meat is discharged from the material-discharging end 3 of the nozzle 4 and is filled in the sheep intestine 6, and the twisted portions 9 are concurrently formed consecutively in synchronism with the discharging and suspension of the discharging of the meat from the material-discharging end 3 of the nozzle 4. Immediately after the incomplete twisting of two revolutions is formed in the twisted portion 9 by the clamping of the sheep intestine 6 by the clamping means 320 in the vicinity of the material-discharging end 3, one hook 779 is moved toward the front of the material-discharging end 3, and catches the complete twisted portion 9 which has already been formed one link forwardly of that incompletely twisted portion 9 in the immediate vicinity of the material-discharging end 3, and the hook 779 transports this complete twisted portion 9 in the horizontal direction perpendicular to the axis of the nozzle 4 in conjunction with the travel of the chain 777. The sheep intestine 6 into which the meat has been filled is thus formed consecutively into loops by the hooks 779 for each sixth twisted portion 9, and is transported. The sheep intestine 6, which is suspended from the hook 779 and formed in a loop with the space 803 secured by the pair of hooks 801 and 802, is transported to the distal end side of the smoking stick 786 supported by the hooks 780 which are consecutively intermittently moved in the same way as the hooks 779. The sheep intestine 6 is subsequently transported toward the rear end of the smoking stick 786 by the hooks 779 in such a manner that the smoking stick 786 is inserted into the space 803. Upon completion of the filling of meat in one sheep intestine 6, the rotation of the wheels 773 and 774 is stopped. After the wheels 773 and 774 are stopped, the smoking stick 786 supported on the hooks 780 is manually removed by the operator from the hooks 780 such that the sheep intestine 6 suspended in the form of loops is removed simultaneously from the hook portions 801 and 802, thereby making it possible to obtain the meat-filled sheep intestine 6 suspended from the smoking stick in the form of loops. The smoking stick 786 supported by the hooks 780 which are made to travel is adapted to abut against a movement-preventing member at a rear end thereof so that the smoking stick 786 will not move in conjunction with the movement of the hooks 780.

The looping and transferring means 770 consecutively transports the sheep intestine 6 released from the material-discharging end 3 in the horizontal direction perpendicular to the axis of the nozzle 4, and also makes it possible to effect both the transfer of the loops and the suspension from the smoking stick, following the formation of the loops. Accordingly, the looping and transferring means 770 allows the release of the sheep intestine 6 from the material-discharging end 3 to be effected smoothly without causing the meat-filled sheep intestine 6 to stay at the material-discharging end 3, and makes it possible to prevent the breakage of the sheep intestine and attain labor saving. In addition, since the loop is formed by catching the complete twisted portion 9 which has already been formed one link forwardly of the incomplete twisted portion 9 in the immediate vicinity of the material-discharging end 3, the sheep intestine 6 is less susceptible to the effect of the unevenness of the interval between adjacent twisted portions 9, which is liable to occur as compared with artificial casings. Hence, the number of the twisted portions 9 in one loop can always be fixed. In the looping and transferring means 770, the lower wheels 774 and 776 and the lower endless chain 778 may be omitted, and the looping and transferring means may be formed by hooks in which the lower hooks 780 supporting the smoking stick 786 are integrally attached to the upper hooks 779. Furthermore, the lower hooks 780 may be omitted, in which case the smoking stick 786 is supported in a cantilevered manner.

Instead of the above-described removing means, the removing means of the present invention may be embodied by a transporting means in which a casing, e.g., a cellulose casing or a collagen casing, which contains the meat and is released from the material-discharging end 3, is transported consecutively along the axial direction of the nozzle 4.

Figure 27:
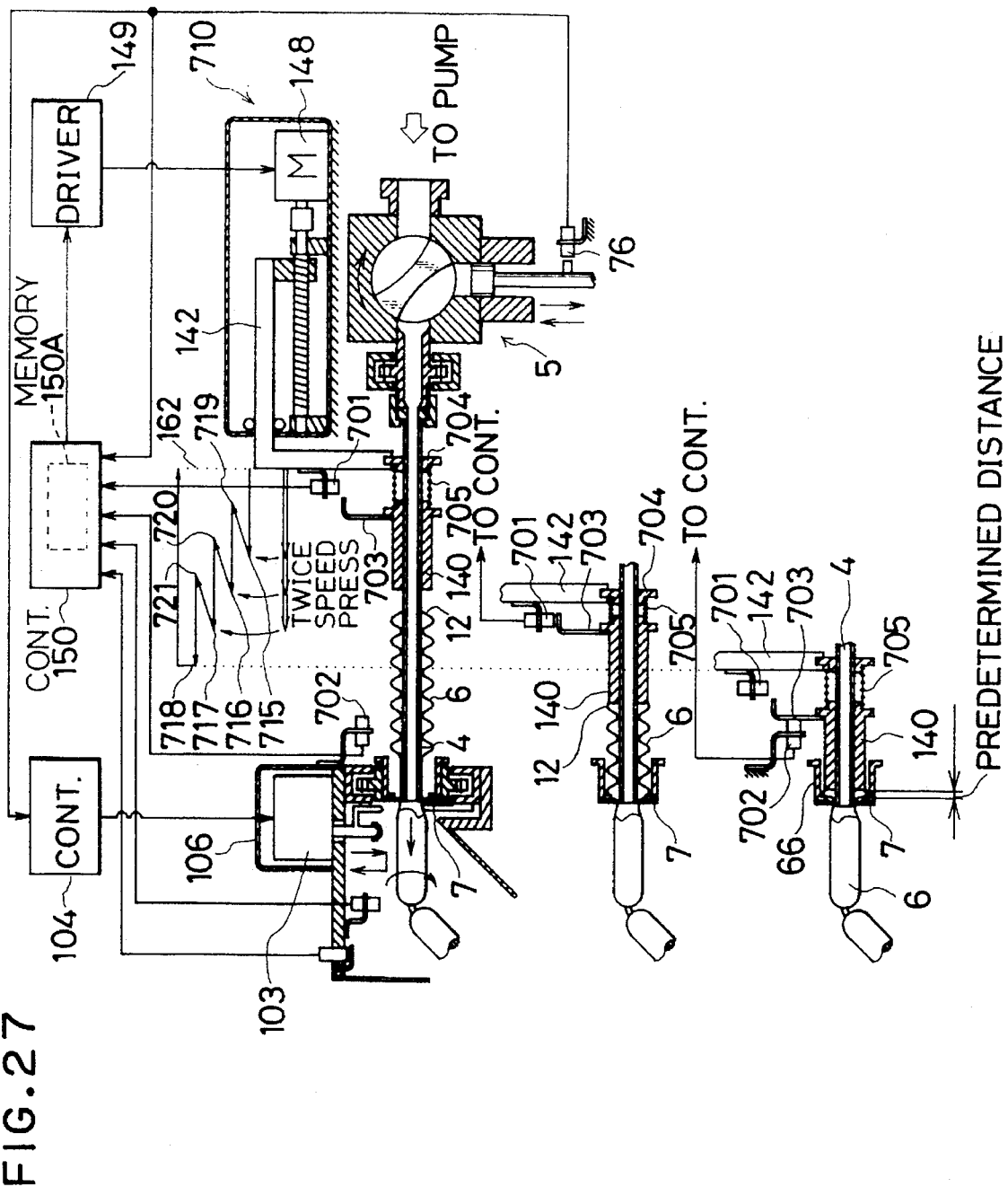
FIG. 27 is an explanatory diagram of the operation of still another example of the controlled-pusher means of the present invention.
Figure 28:
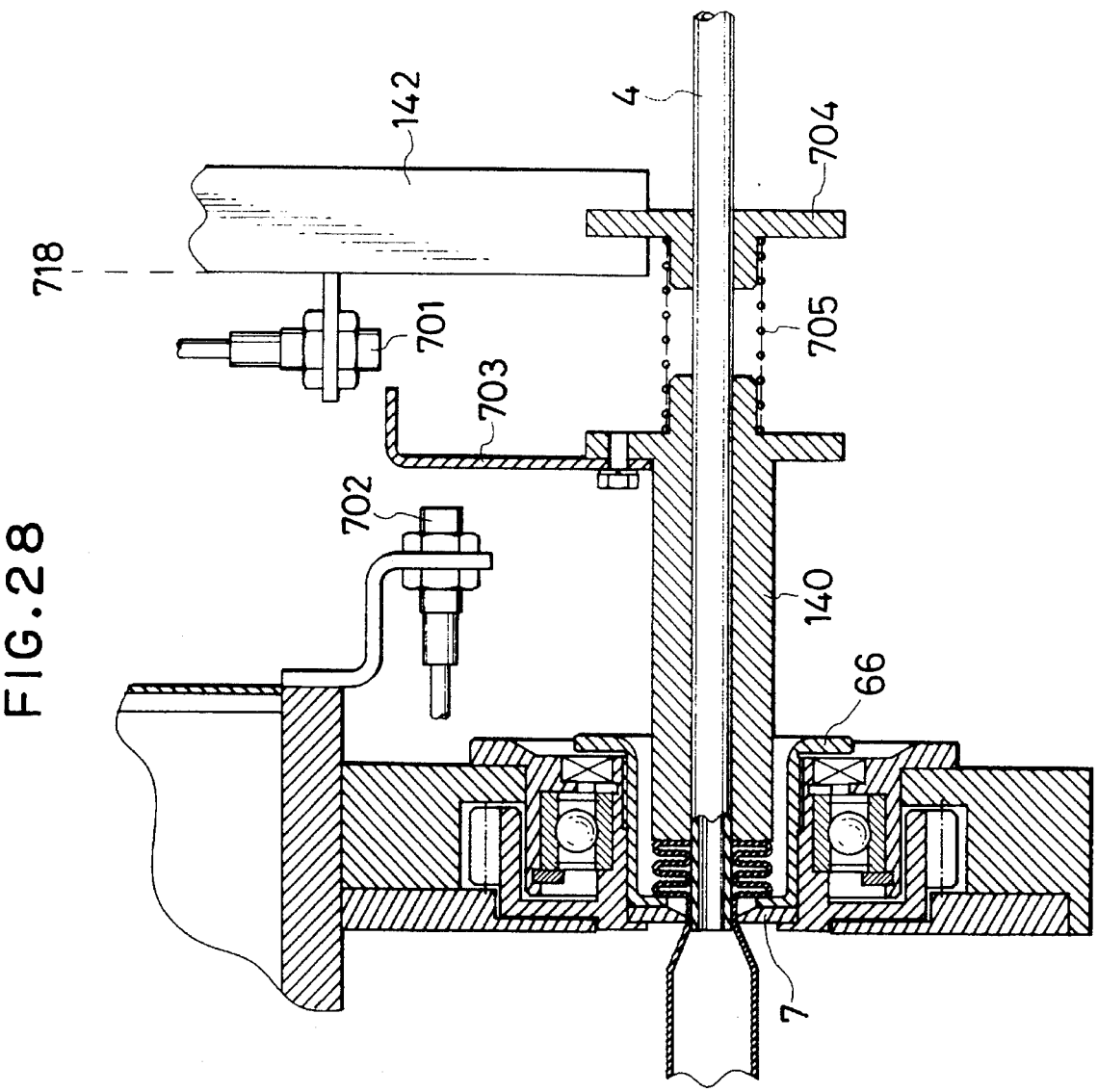
FIG. 28 is a partial detailed explanatory diagram of the operation of the controlled-pusher means of the example shown in FIG. 27.

In the controlled-pusher means 13 shown in FIG. 14, a change in the form of the sheep intestine 6 is detected by the photosensor 251 to control the operation of the motor 148 on the basis of this detection signal, and the unshirred portion 253 of the sheep intestine 6 is detected by the photosensor 252 to control the motor of the material-supplying means 5. Instead of this controlled-pusher means 13, it is possible to adopt a controlled-pusher means 710 which is formed, as shown in FIGS. 27 and 28. In this controlled-pusher means 710, a sensor (proximity sensor) 701 corresponding to the photosensor 251 is attached to the connecting member 142, a sensor (proximity sensor) 702 corresponding to the photosensor 252 is attached to the outer side of the cover 106, and a detecting element 703 is attached to the intestine-pushing collar 140. The excessive pushing of the sheep intestine 6 by the intestine-pushing collar 140 is detected by the sensor 701, as shown in FIG. 27, and the predetermined interval between the cylinder 66 and the distal end of the intestine-pushing collar 140, i.e., the tailing end of the sheep intestine 6, is detected by the sensor 702, as shown in FIG. 27. Furthermore, a coil spring 705 having opposite ends secured to the intestine-pushing collar 140 and a spring bracket 704, respectively, is disposed between the intestine-pushing collar 140 and the spring bracket 704, and the spring bracket 704 is coupled to the connecting member 142. The connecting member 142 is moved in accordance with a pushing program which is stored in the storage means 150A in the controlling device 150 and which will be described below.

That is, the motor is operated, and the connecting member 142 is first moved at a double speed from the initial position 162 shown in FIG. 27. As a result, the intestine-pushing collar 140 is moved toward the trailing end 12 of the sheep intestine 6. When the distal end of the connecting member 142 is being moved during the section from the initial position 162 to a position 715, if the sheep intestine 6 is pushed excessively by the intestine-pushing collar 140, as shown in FIG. 27, and the coil spring 705 is compressed to cause the sensor 701 to detect the detecting element 703 and issue a detection signal. (hereafter referred to as an intestine-excessively-pushing signal), the connecting member 142 is moved continuously at the double speed up to the position 715, and after arrival at the position 715, the connecting member 142 is retracted at an ordinary speed up to a position 719. After arrival at the position 719, the connecting member 142 is stopped for a period in which a predetermined time duration, e.g., 4 seconds, and a time duration until the occurrence of eight detection signals from the sensor 76 are added together (hereafter, this period will be referred to as an intestine-excessively-pushing overcoming period). After the lapse of this period, the connecting member 142 is moved toward a position 716 at the ordinary speed, and then during the section from the position 716 to a position 720 the connecting member 142 is retracted at the ordinary speed. At the position 720, if the intestine-excessively-pushing signal is sent from the sensor 701 in the section from the position 719 to the position 716, the connecting member 142 is stopped for the intestine-excessively-pushing overcoming period. Meanwhile, if the intestine-excessively-pushing signal is not sent in the section from the position 719 to the position 716, the connecting member 142 is stopped for 4 seconds. Thereafter, the connecting member 142 is advanced and retracted to a position 717, a position 721, and a position 718. At the position 721, the connecting member 142 is stopped in the same way as described above, and after the connecting member 142 is stopped at the position 718, as shown in FIG. 28, the intestine-pushing collar 140 alone is made to advance as the coil spring 705 is extended. As a result, when the sensor 702 detects the detecting element 703, as shown in FIG. 27, and sends a detection signal, the connecting member 142 is moved from the position 718 to the initial position 162, and the operation of the material-supplying means 5 is concurrently stopped. The timing of initiating the retraction of the connecting member 142 to the initial position 162 and the timing of stopping the operation of the material-supplying means 5 can be individually adjusted by a timer. Subsequently, when a new sheep intestine 6 is fitted over the nozzle 4, the above-described operation is repeated.

If the sensor 701 does not send the intestine-excessively-pushing signal during the movement at the double speed from the position 162 to the position 715, the connecting member 142 is continuously advanced at the double speed without stopping and retracting the connecting member 142 at the position 715. When the sensor 701 has sent the intestine-excessively-pushing signal in the section from the position 715 to the position 716, the connecting member 142 is continuously moved at the double speed up to the position 716. Upon arrival at the position 716, the connecting member 142 is retracted at the ordinary speed up to the position 720. After the connecting member 142 is stopped at the position 720 for the intestine-excessively-pushing overcoming period, the connecting member 142 is advanced, retracted, and stopped for a predetermined period so as to be brought to the position 717, position 721, and position 718, respectively. Thereafter, the same operation is carried out.

For instance, if the sensor 701 does not send the intestine-excessively-pushing signal during the double-speed movement from the position 162 to the position 716, the connecting member 142 is continuously advanced at the double speed without stopping and retracting the connecting member 142 at the position 716. If the sensor 701 sends the intestine-excessively-pushing signal in the section from the position 716 to the position 717, the connecting member 142 is continuously moved at the double speed up to the position 717. Upon arrival at the position 717, the connecting member 142 is retracted at the ordinary speed up to the position 721, and after the connecting member 142 is stopped for the intestine-excessively-pushing overcoming period, the connecting member 142 is advanced so as to be brought to the position 718. Further, although, in the pushing program of this example, an arrangement is provided to retract the connecting member 142 three times, the connecting member 142 may be retracted a greater number of times than that in view of the length of the sheep intestine 6 and the like. Furthermore, the time duration of the stop is not limited to the above-described example. Moreover, instead of the above-described pushing program, an arrangement may be provided such that if the intestine-excessively-pushing signal is sent during the movement of the connecting member 142, the connecting member 142 is retracted from that position of movement to a predetermined position.

Figure 29:
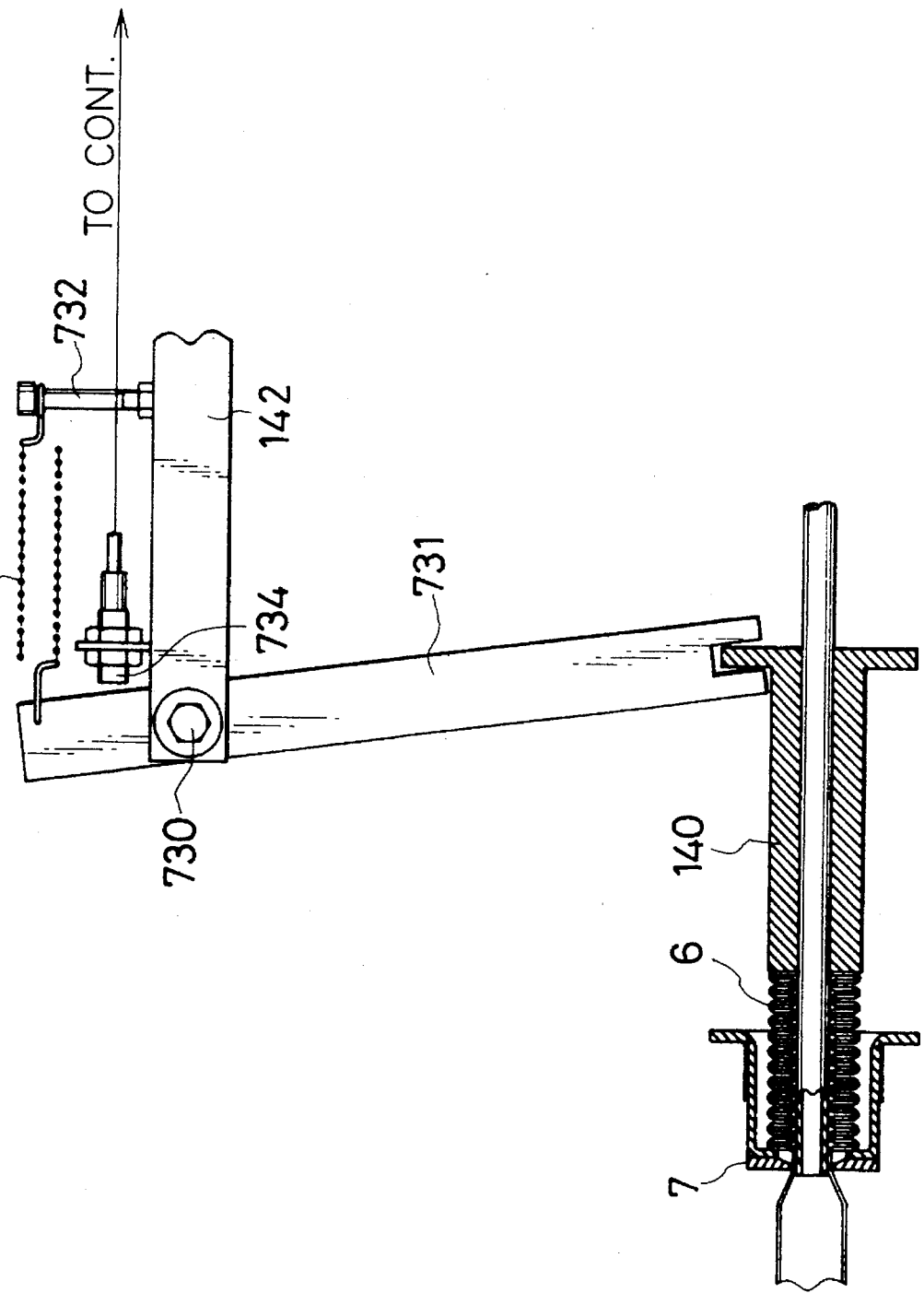
FIG. 29 is a explanatory diagram of a further example of the controlled-pusher means of the present invention.
Figure 30:
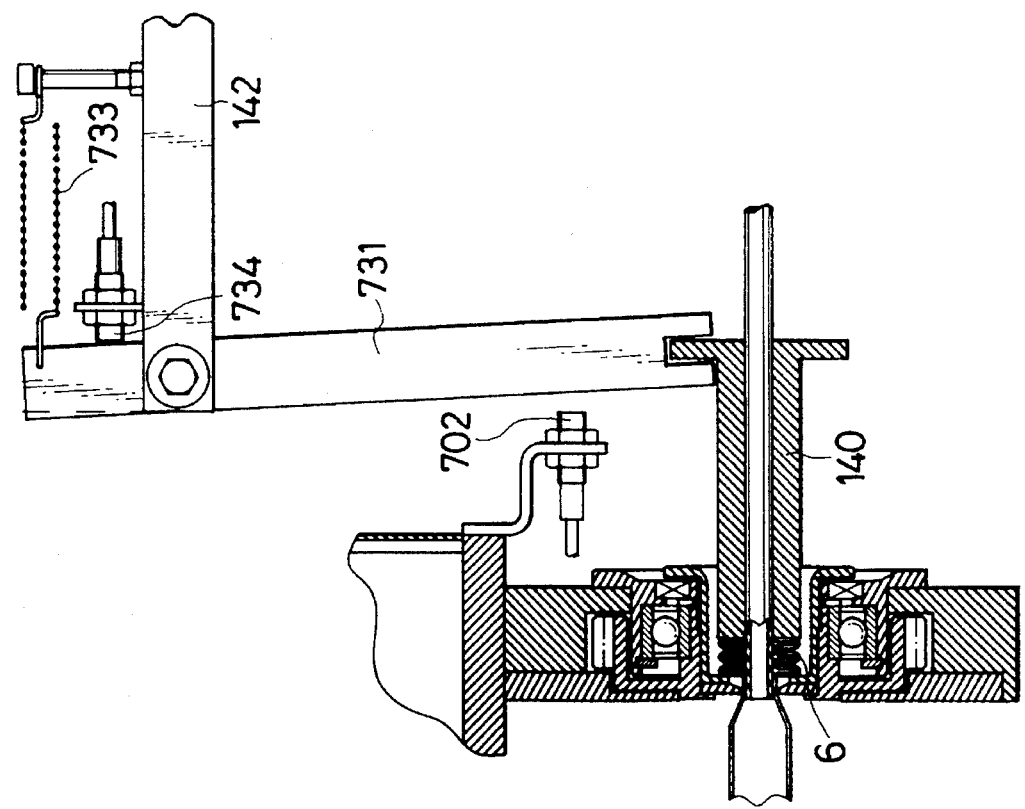
FIG. 30 is an explanatory diagram of the operation of the controlled-pusher means of the example shown in FIG. 29.
Figure 31:
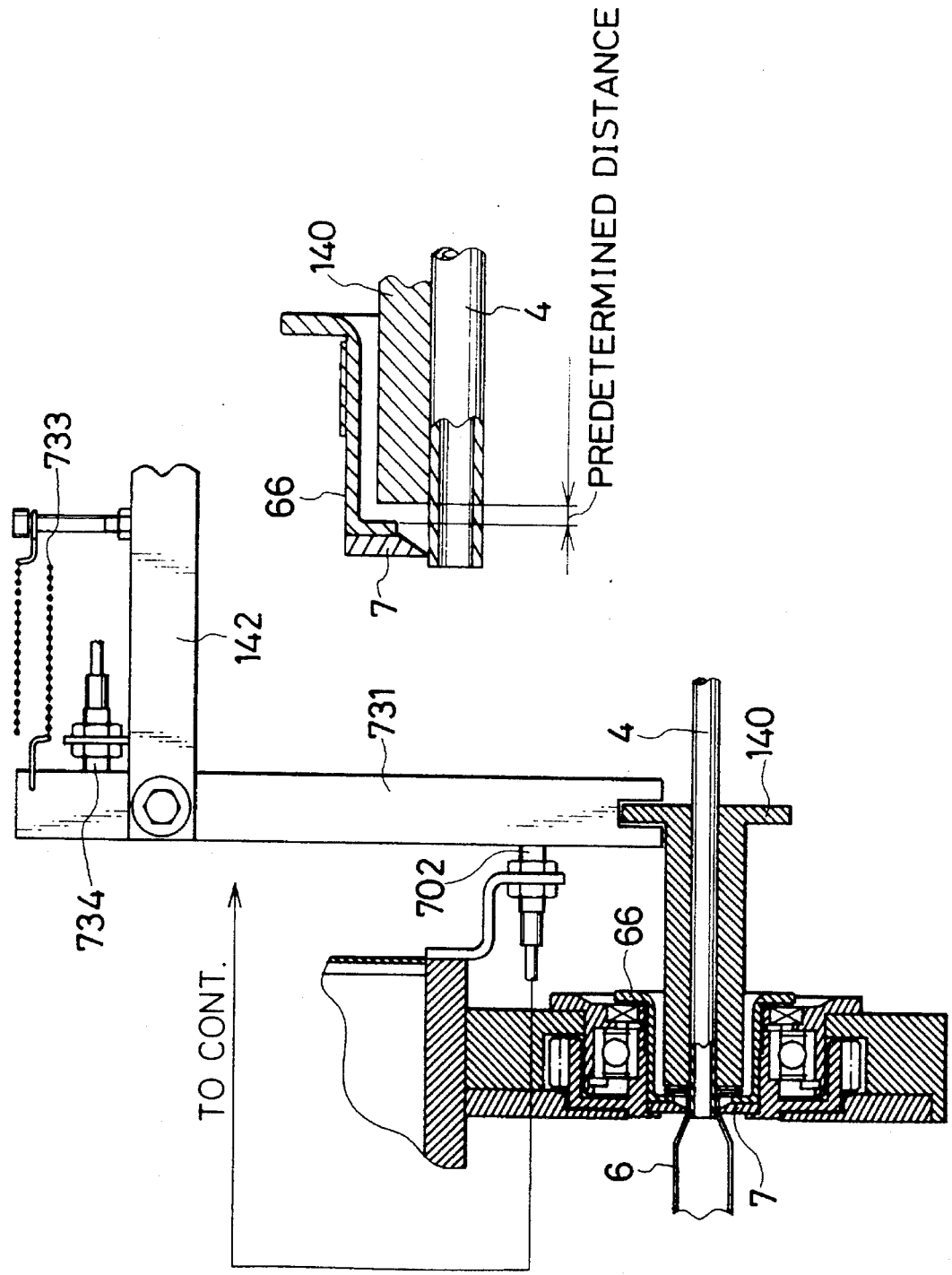
FIG. 31 is an explanatory diagram of the operation of the controlled-pusher means of the example shown in FIG. 29.

In the controlled-pusher means 710, the coil spring 705 is disposed between the intestine-pushing collar 140 and the spring bracket 704, but an arrangement may be alternatively provided such that, as shown in FIGS. 29 to 31, an arm 731 is attached rotatably to the connecting member 142 via a shaft 730, a coil spring 733 is disposed between a pin 732 embedded in the connecting member 142 and one end of the arm 731, and the other end of the arm 731 is made to engage with the intestine-pushing collar 140, so as to push the sheep intestine 6 by the resiliency of the coil spring 733. In this case, as shown in FIG. 29, a sensor 734 corresponding to the sensor 701 may be attached to the connecting member 142 to send the intestine-excessively-pushing signal when the pushing of the sheep intestine 6 by the intestine-pushing collar 140 becomes excessive, and the arm 731 is rotated and one end thereof is moved away a predetermined distance from the sensor 734. Alternatively, an arrangement may be provided such that, as shown in FIG. 30, the movement of the connecting member 142 is stopped at the position 718, and the intestine-pushing collar 140 is subsequently advanced by the resiliency of the coil spring 733. Then, when the interval between the cylinder 66 and the distal end of the intestine-pushing collar 140 has become a predetermined interval as described above, as shown in FIG. 31, the approaching of the arm 731 is detected by the sensor 702, the connecting member 142 is moved to the initial position 162 on the basis of this detection, and the operation of the material-supplying means 5 is concurrently stopped.

Figure 32:
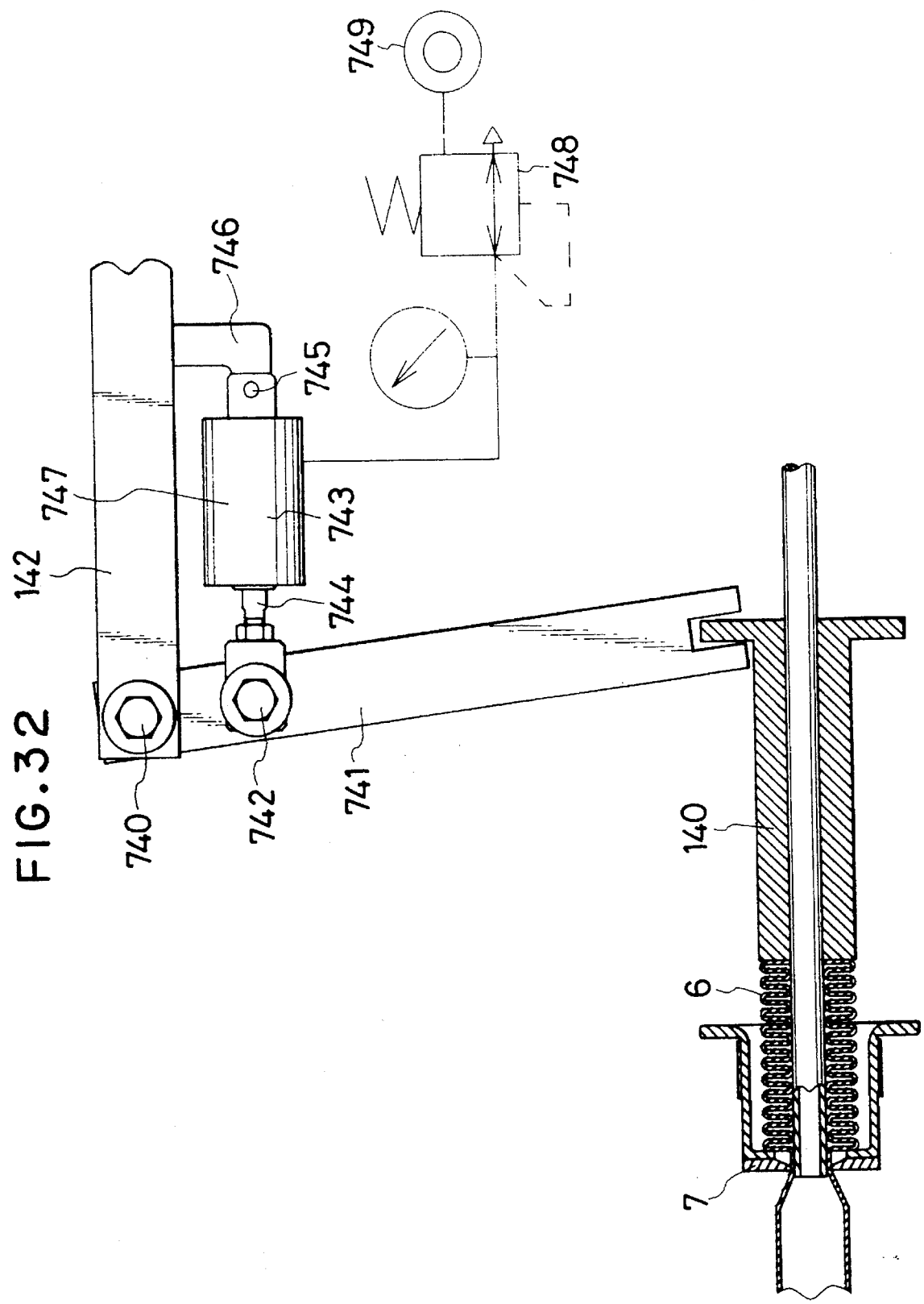
FIG. 32 is an explanatory diagram of a still further example of the controlled-pusher means of the present invention.

In the above-described controlled-pusher means, the resilient pushing force by means of the coil springs 267, 705, and 733 and so on is applied to the sheep intestine 6, but an arrangement may be provided as follows: As shown in FIG. 32, one end of an arm 741 is attached rotatably to connecting member 142 via a shaft 740, and a piston rod 744 of a pneumatic cylinder device 743 is rotatably coupled to the arm 741 via a shaft 742, while a cylinder 747 of the pneumatic cylinder device 743 is rotatably coupled to the connecting member 142 via a pin 745 and a bracket 746. The interior of the cylinder 747 and an air pressure source 749 are connected to each other via a relief regulator 748, and the intestine-pushing collar 140 is made to engage with the other end of the arm 741, such that constant air resiliency is generated from the pneumatic cylinder device 743 by the operation of the relief regulator 748 even if the connecting member 142 is advanced excessively in comparison with the length of the sheep intestine 6 remaining on the nozzle 4. As a result, the sheep intestine 6 is pushed by the intestine-pushing collar 140 with constant air resiliency.

In the above-described determining means which is one example of the determining means and is arranged to determine the position of a twist occurring in the casing in synchronism with the intermittent supply of the material by the material-supplying means, the synchronous determination is not necessarily restricted, if a description is given in connection with the above-described example, to a method in which the determination is made always at a fixed timing and during a fixed period when the discharging of the material is being stopped, and should be construed to include a method in which the determination is made at an arbitrary timing during the suspension of discharge or during an arbitrary period during the suspension of discharge.

In addition, although in the above-described example the determining means is formed by being provided with the clamping means and/or the bending means, an arrangement may be alternatively provided such that, as shown in FIGS. 33 and 34, a thin horizontal round rod 750 is attached on the cover 70 to cause a bend to be readily formed in the twisted portion 9 of the meat-filled sheep intestine 6 suspended by its own weight and also to prevent the rotation of the meat-filled sheep intestine 6, thereby determining the position of the twist occurring in the meat-filled sheep intestine 6. Thus a supporting member is formed by the horizontal round rod 750, and the sheep intestine 6 released, and suspended by its own weight, from the material-discharging end 3 is supported from a lower position by the horizontal round rod 750. At this supporting position, the formation of a bend in the sheep intestine 6 is facilitated, and the sheep intestine 6 is substantially prevented from rotating. If the determining means is embodied by this supporting member, it is possible to provide an apparatus for manufacturing a chain of linked sausages or the like which has a simpler construction.

Furthermore, the present invention can be effectively applied to an apparatus of a type in which, as disclosed in U.S. Pat. No. 3,140,509 or Japanese Patent Publication No. 353/1966, the nozzle is rotated only during the twisting process, and the rotation of the filled sheep intestine is prevented by a fixed guide. Further, the material-supplying means in the present invention is not limited to one which is provided with a rotary valve and a piston.

As described above, in accordance with the present invention, the position of occurrence of twisting can be substantially fixed, so that the individual weight of the material between the twists can be substantially fixed, and also the number of twists at the twisted portion can be fixed, thereby making it possible to prevent the occurrence of untwisting. Further, since the conventional fixed guide can be eliminated, it is possible to reduce the resistance applied to the casing containing the material and released from the material-discharging end, and it is hence possible to favorably prevent the breakage of the casing. Furthermore, in accordance with the present invention, it is possible to provide an apparatus for manufacturing a chain of linked sausages or the like which is capable of rendering the product configuration and resiliency (hardness) constant and uniform and of further reducing the breakage of the casings since the sliding resistance of the casing fitted over the nozzle can be set to a fixed level. Moreover, the apparatus of the present invention can be applied to both casings of natural intestines such as sheep intestines and hog intestines and artificial casings, and also can be applied to both types in which the nozzle is rotated continuously and in which the nozzle is rotated intermittently. In addition, it is possible to attain the automation of the stuffing operation and labor saving, and even if the casing becomes broken, the material-filling operation can be continued without stopping the operation of the apparatus. Hence, the looping operation and the smoking-stick suspension operation can be carried out continuously, following the material-filling operation.

What is claimed is:

1. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and determining means for determining a position of a twist occurring in the casing which contains the material discharged from said material-discharging end and is released from said material-discharging end, said determining means engaging with the casing in a state where the discharging of the material from the material-discharging end is stopped, to intermittently apply a change of configuration to the casing and to thereby determine the position of said twist; a portion of said determining means engaging with the casting being stationary in a discharging direction of the material from the material-discharging end, while said determining means engages with the casing.

2. An apparatus for manufacturing a chain of linked food products according to claim 1, wherein said determining means determines the position of the twist occurring in the casing in synchronism with the intermittent supply of the material by said material-supplying means.

3. An apparatus for manufacturing a chain of linked food products according to claim 2, wherein said determining means includes detecting means for detecting the intermittent supply of the material by said material-supplying means and clamping means for clamping the casing released from said material-discharging end on the basis of a detection signal from said detecting means.

4. An apparatus for manufacturing a chain of linked food products according to claim 2, wherein said determining means includes detecting means for detecting the intermittent supply of the material by said material-supplying means and bending means for bending the casing released from said material-discharging end on the basis of a detection signal from said detecting means.

5. An apparatus for manufacturing a chain of linked food products according to claim 1, wherein said determining means includes a supporting member for supporting from a lower position the casing released from said material-discharging end and suspended by its own weight, and for facilitating a bend in the casing at a supporting position of said supporting member and preventing the rotation of the casing at a supporting position of said supporting member.

6. An apparatus for manufacturing a chain of linked food products according to claim 1, further comprising removing means for removing from a vicinity of said material-discharging end the casing containing the material and released from said material-discharging end.

7. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and controlled-pusher means for pushing a trailing end of the casing fitted over said nozzle towards said material-discharging end in an actively controlled state by means of a controlling means.

8. An apparatus for manufacturing a chain of linked food products according to claim 7, wherein said controlled-pusher means includes storage means for storing a pushing program in advance, and the trailing end of the casing is pushed in accordance with said pushing program.

9. An apparatus for manufacturing a chain of linked food products according to claim 7, wherein said controlled-pusher means includes an electric motor for generating a pushing force.

10. An apparatus for manufacturing a chain of linked food products according to claim 9, wherein said controlled-pusher means further includes storage means for storing a pushing program in advance, and said electric motor is operated in accordance with said pushing program stored in said storage means.

11. An apparatus for manufacturing a chain of linked food products according to claim 9, wherein said controlled-pusher means further includes detecting means for detecting a form of the casing fitted over said nozzle, and said electric motor is operated in accordance with a detection signal from said detecting means.

12. An apparatus for manufacturing a chain of linked food products according to claim 7, further comprising removing means for removing from a vicinity of said material-discharging end the casing containing the material and released from said material-discharging end.

13. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle;

transporting means for receiving, at a lower position spaced apart a predetermined distance from said material-discharging end, the casing containing the material and released and suspended from said material-discharging end, and for consecutively transporting the material-containing casing received; and controlled-pusher means for pushing a trailing end of the casing fitted over said nozzle toward said material-discharging end in an actively controlled state.

14. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and determining means for determining the position of a twist occurring in the casing which contains the material discharged from said material-discharging end and is released from said material-discharging end, said determining means determining the position of the twist occurring in the casing in synchronism with the intermittent supply of the material by said material-supplying means, said determining means including detecting means for detecting the intermittent supply of the material by said material-supplying means and clamping means for clamping the casing released from said material-discharging end on the basis of a detection signal from said detecting means.

15. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and determining means for determining the position of a twist occurring in the casing which contains the material discharged from said material-discharging end and is released from said material-discharging end, said determining means determining the position of the twist occurring in the casing in synchronism with the intermittent supply of the material by said material-supplying means, said determining means including detecting means for detecting the intermittent supply of the material by said material-supplying means and bending means for bending the casing released from said material-discharging end on the basis of a detection signal from said detecting means.

16. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and controlled-pusher means for pushing a trailing end of the casing fitted over said nozzle towards said material-discharging end in a controlled state, said controlled-pusher means including storage means for storing a pushing program in advance, and the trailing end of the casing is pushed in accordance with said pushing program.

17. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and controlled-pusher means for pushing a trailing end of the casing fitted over said nozzle towards said material-discharging end in a controlled state, said controlled-pusher means including an electric motor for generating a pushing force, and storage means for storing a pushing program in advance, and said electric motor is operated in accordance with said pressing program stored in said storage means.

18. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and controlled-pusher means for pushing a trailing end of the casing fitted over said nozzle towards said material-discharging end in a controlled state, said controlled-pusher means including an electric motor for generating a pushing force, storage means for storing a pushing program in advance, and detecting means for detecting a form of the casing fitted over said nozzle, and said electric motor being operated in accordance with said pressing program stored in said storage means and a detection signal from said detecting means.

19. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle;

controlled-pusher means for pushing a trailing end of the casing fitted over said nozzle towards said material-discharging end in a controlled state; and removing means for removing from a vicinity of said material-discharging end the casing containing the material and released from said material-discharging end.

20. An apparatus for manufacturing a chain of linked food products comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and determining means for intermittently applying a change of configuration to the casing which contains the material discharged from said material-discharging end and is release from said material-discharging end to determine the position of a twist occurring in the casing, said determining means including a member which is moved in synchronism with the intermittent supply of the material by said material-supplying means to apply the change of configuration to the casing.

21. An apparatus for manufacturing a chain of linked food products according to claim 7, wherein said controlled-pusher means includes detecting means for detecting a form of the casing fitted over said nozzle, and is so adapted to push the trailing end of the casing on the basis of a detection signal from said detecting means.

22. An apparatus for manufacturing a chain of linked food products according to claim 16, wherein said controlled-pusher means includes detecting means for detecting a form of the casing fitted over said nozzle, and is so adapted to push the trailing end of the casing on the basis of a detection signal from said detecting means.

23. An apparatus for manufacturing a chain of linked food products according to claim 21, wherein said controlled-pusher means is so adapted to start and stop the pushing of the trailing end of the casing on the basis of the detection signal from said detecting means.

24. An apparatus for manufacturing a chain of linked food products according to claim 7, wherein said controlled-pusher means includes means for controlling the pushing speed of the trailing end of the casing.

25. An apparatus for manufacturing a chain of linked food products according to claim 19, further comprising detecting means for detecting the intermittent supply of the material by the material-supplying means, the removing means including hooking means for hooking the casing containing the material and released from said material-discharging end, said hooking means being controlled in movement thereof in accordance with a detection signal from said detecting means.

26. An apparatus for manufacturing a chain of linked food products comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle;

determining means for intermittently applying a change of configuration to the casing which contains the material discharged from said material-discharging end and is released from said material-discharging end to determine the position of a twist occurring in the casing;

removing means for removing from a vicinity of said material-discharging end the casing containing the material and released from said material-discharging end; and detecting means for detecting the intermittent supply of the material by the material-supplying means, the removing means including hooking means for hooking the casing containing the material and released from said material-discharging end, said hooking means being controlled in movement thereof in accordance with a detection signal from said detecting means.

27. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle;

removing means for removing from a vicinity of said material-discharging end the casing containing the material and released from said material-discharging end; and detecting means for detecting the intermittent supply of the material by the material-supplying means; the removing means including hooking means for hooking the casing containing the material and released from said material-discharging end, said hooking means being controlled in movement thereof in accordance with a detection signal from said detecting means.

28. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle; and determining means for determining the position of a twist occurring in the casing which contains the material discharged from said material-discharging end and is released from said material-discharging end, said determining means including a supporting member for supporting from a lower position the casing released from said material-discharging end and suspended by its own weight, and for facilitating a bend in the casing at a supporting position of said supporting member and preventing the rotation of the casing at said supporting position of said supporting member.

29. An apparatus for manufacturing a chain of linked food products according to claim 6, wherein said removing means comprises hooking means, which is moved in a substantially horizontal plane, for hooking the casing containing the material and released from the material-discharging end.

30. An apparatus for manufacturing a chain of linked food products according to claim 12, wherein said removing means comprises hooking means, which is moved in a substantially horizontal plane, for hooking the casing containing the material and released from the material-discharging end.

31. An apparatus for manufacturing a chain of linked food products, comprising:

a nozzle having a material-discharging end;

material-supplying means for intermittently supplying a substantially fixed amount of a material into said nozzle;

a braking member for braking the release of a casing fitted over said nozzle from said material-discharging end;

rotation-imparting means for rotating said nozzle;

determining means for determining the position of a twist occurring in the casing which contains the material discharged from said material-discharging end and is released from said material-discharging end; a portion of said determining means engaging with the casing being stationary in a discharging direction of the material from the material-discharging end, while said determining means engages with the casing; and controlled-pusher means for pushing a trailing end of the casing fitted over said nozzle towards said material-discharging end in an actively controlled state by means of a controlling means.

32. An apparatus for manufacturing a chain of linked food products according to claim 31, further comprising removing means for removing from a vicinity of said material-discharging end the casing containing the material and released from said material-discharging end.

33. An apparatus for manufacturing a chain of linked food products according to claim 32, wherein said removing means comprises hooking means, which is moved in a substantially horizontal plane, for hooking the casing containing the material and released from the material-discharging end.

* * * * *

UNITED STATES PATENT AND TRADEMARK OFFICE
CERTIFICATE OF CORRECTION

PATENT NO. : 5,480,346
DATED : January 2, 1996
INVENTOR(S) : MINORU KASAI; MINORU NAKAMURA It is certified that error appears in the above-indentified patent and that said Letters Patent is hereby corrected as shown below:

On the title page, item [73] change the assignee's name to --HITEC--.

In the Abstract, lines 1-2, delete "sausages or the like" and insert --food products--;

Column 2, lines 47-48, delete "sausages or the like" and insert --food products--; lines 55-56, delete "sausages or the like" and insert --food products--; lines 62-63, delete "sausages or the like" and insert --food products--.

Column 3, lines 2-3, delete "sausages or the like" and insert --food products--; lines 10-11, delete "sausages or the like" and insert --food products--; lines 14-15, delete "sausages or the like" and insert --food products--; line 23, delete "sausages or the like" and insert --food products--; line 37, delete "sausages or the like" and insert --food products--; lines 43-44, delete "sausages or the like" and insert --food products--; lines 55-56, delete "sausages or the like" and insert --food products--.

Column 4, line 39, delete "sausages or the like" and insert --food products--; line 55, delete "sausages or the like" and insert --food products--; line 62, delete "sausages or the like" and insert --food products--.

Column 6, line 34, delete "Side" and insert --side--; line 43, delete "sausages or the like" and insert --food products--.

Column 7, line 11, delete "meter" and insert --member--.

Column 12, line 2, after "6" insert --),--.

Column 18, line 43, delete "meatfilled" and insert --meat-filled--.

Column 20, line 63, delete "stick" and insert --stick-supplying--.

Column 25, line 40, delete "sausages or the like" and insert --food products--; lines 62-63, delete "sausages or the like" and insert --food products--.

UNITED STATES PATENT AND TRADEMARK OFFICE
CERTIFICATE OF CORRECTION

PATENT NO. : 5,480,346
DATED : January 2, 1996
INVENTOR(S) : MINORU KASAI; MINORU NAKAMURA It is certified that error appears in the above-indentified patent and that said Letters Patent is hereby corrected as shown below:

Column 26, line 30, after "twist" delete ";" and insert --,--; line 31, delete "casting" and insert --casing--; line 33, after "end" delete the comma.

Column 29, line 56, delete "release" and insert --released--.

Column 32, line 15, after "end" delete ";" and insert --,--; line 16, delete the comma.

Signed and Sealed this

Thirtieth Day of July, 1996

Attest:

BRUCE LEHMAN

*Attesting Officer*  *Commissioner of Patents and Trademarks*